(12) United States Patent
Frattini et al.

(10) Patent No.: US 11,667,548 B2
(45) Date of Patent: ***Jun. 6, 2023

(54) METAL-ORGANIC FRAMEWORKS FOR THE REMOVAL OF MULTIPLE LIQUID PHASE COMPOUNDS AND METHODS FOR USING AND MAKING SAME

(71) Applicant: Electric Power Research Institute, Inc., Palo Alto, CA (US)

(72) Inventors: Paul L. Frattini, Los Altos, CA (US); Keith Paul Fruzzetti, San Jose, CA (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/494,463

(22) Filed: Oct. 5, 2021

(65) Prior Publication Data

US 2022/0098060 A1 Mar. 31, 2022

Related U.S. Application Data

(63) Continuation of application No. 16/550,237, filed on Aug. 25, 2019, now Pat. No. 11,168,006.
(Continued)

(51) Int. Cl.
*C02F 1/42* (2023.01)
*C02F 1/28* (2023.01)
(Continued)

(52) U.S. Cl.
CPC ............ *C02F 1/42* (2013.01); *B01J 20/226* (2013.01); *B01J 20/3085* (2013.01);
(Continued)

(58) Field of Classification Search
None
See application file for complete search history.

(56) References Cited

U.S. PATENT DOCUMENTS

| 5,073,575 A | 12/1991 | Blanch et al. |
| 11,168,006 B2 * | 11/2021 | Frattini ............... B01J 20/3236 |

FOREIGN PATENT DOCUMENTS

| CN | 105175295 A | | 12/2015 | |
| DE | 2051888 A1 * | | 4/1972 | ........... C07C 381/04 |

OTHER PUBLICATIONS

Lee, Dennis T., et. al., "Catalytic "MOF-Cloth" Formed via Directed Supramolecular Assembly of UiO-66-NH2 Crystals on Atomic Layer Deposition-Coated Textiles for Rapid Degradation of Chemical Warfare Agent Simulants," Chemistry of Materials, May 12, 2017, vol. 29, No. 11, 4894-4903.
(Continued)

*Primary Examiner* — Daniel Berns
(74) *Attorney, Agent, or Firm* — Owens Law Firm, PC

(57) ABSTRACT

The present invention is directed to a ligated metal-organic framework (MOF) for use in removing both anionic and cationic species from a liquid or liquid stream. The present invention also provides methods for placing the MOF on a substrate to form a MOF-containing product that can be used in the removal of certain species from a given fluid. The MOF may be a Zr-based MOF, such as NU-1000, for removal of certain anions, such as oxy-anions, or having an attached thiosulfonyl-thiol ($-SO_2-S-R_2-SH$, where $R_2$ is an alkyl group) ligand for complexation with certain cationic species in addition to the anions. The substrate may be any substrate to which a given MOF may be attached, including inert polypropylene polymer resin beads, a macroscopic fabric such as a mesh material or mesh filter, and a molecular fabric.

7 Claims, 19 Drawing Sheets

Related U.S. Application Data

(60) Provisional application No. 62/751,646, filed on Oct. 28, 2018, provisional application No. 62/723,121, filed on Aug. 27, 2018.

(51) Int. Cl.

| | | |
|---|---|---|
| *B01J 20/02* | (2006.01) | |
| *B01J 20/22* | (2006.01) | |
| *B01J 20/30* | (2006.01) | |
| *B01J 20/32* | (2006.01) | |
| *B01J 47/12* | (2017.01) | |
| *B01J 43/00* | (2006.01) | |
| *B01J 47/127* | (2017.01) | |
| *C02F 101/10* | (2006.01) | |
| *C02F 101/20* | (2006.01) | |
| *C02F 103/34* | (2006.01) | |

(52) U.S. Cl.
CPC ....... *B01J 20/3208* (2013.01); *B01J 20/3236* (2013.01); *B01J 43/00* (2013.01); *B01J 47/127* (2017.01); *B01D 2253/204* (2013.01); *C02F 2001/422* (2013.01); *C02F 2001/425* (2013.01); *C02F 2101/106* (2013.01); *C02F 2101/20* (2013.01); *C02F 2103/34* (2013.01); *Y02W 10/37* (2015.05)

(56) References Cited

OTHER PUBLICATIONS

Li et al., Screening of Zirconium-Based Metal-Organic Frameworks for Efficient Simultaneous Removal of Antimonite (Sb(III)) and Antimonate (Sb(V)) from Aqueous Solution, ACS Sustainable Chem., and Engg. (2-page Internet article), Oct. 24, 2017.

Chen Youning et al., "Research Progress on Surface Modification of Chelating Resin Used for Adsorption of Heavy Metal Ions," Chemistry and Bioengineering, 2017, pp. 7-14, vol. 34, No. 1.

Ma Shangwen, Organic Chemistry, Dec. 31, 1986, p. 205, Henan University Press. (Translated Search Report and Office Action discussing same are attached as translations).

* cited by examiner

FIG. 8A
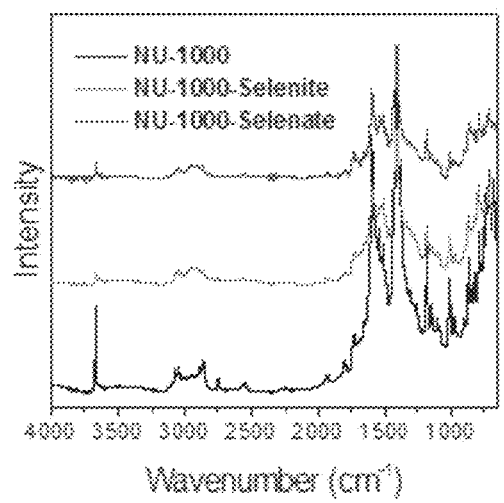
FIG. 8B
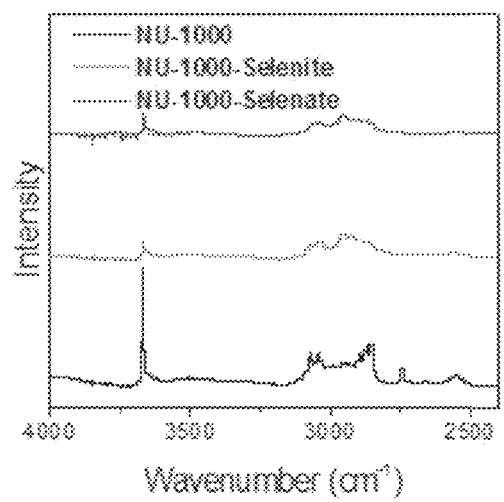
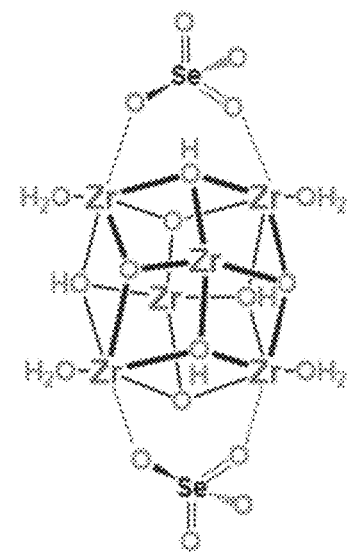
$\eta_2\mu_2$
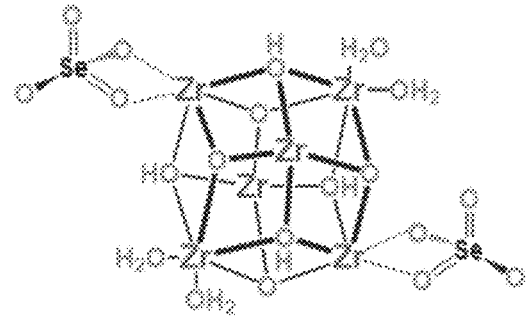
$\mu_2$
FIG. 8C FIG. 9A
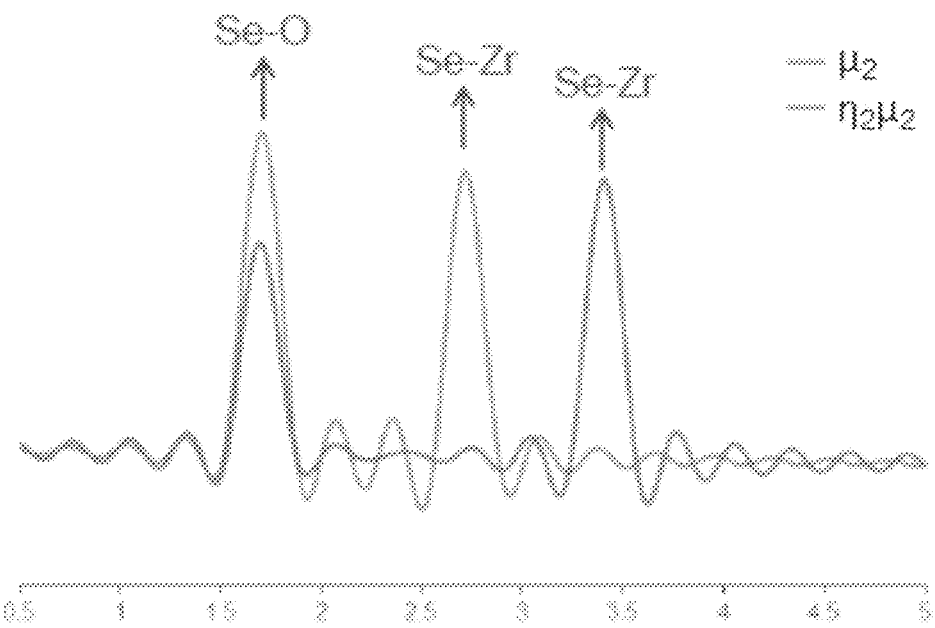
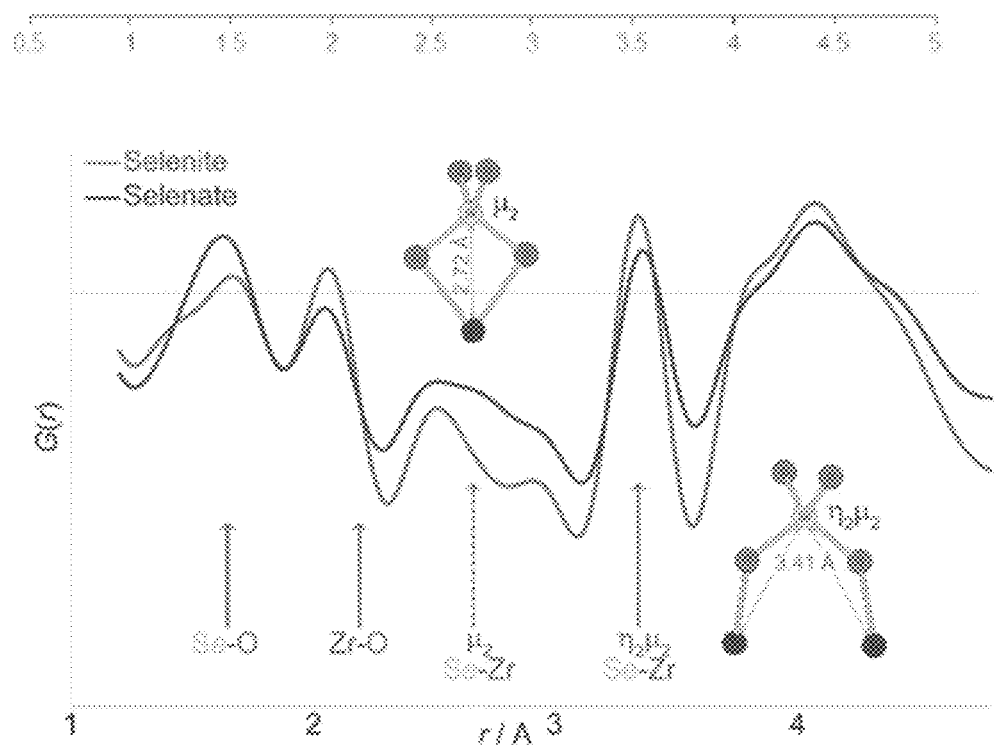
FIG. 9B Langmuir: $C_e/1_e = (1/Q)C_e + 1K_LQ$
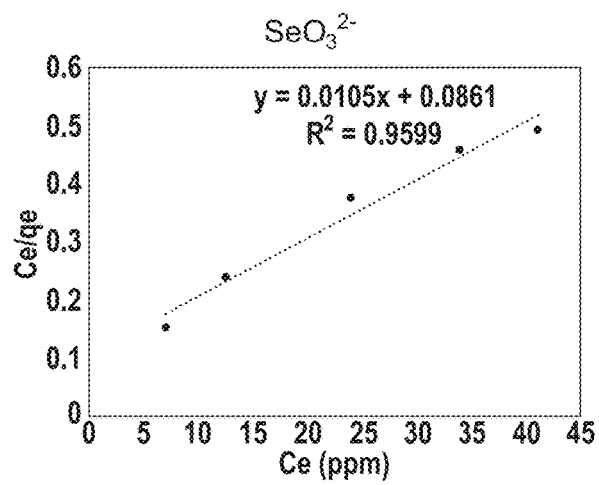
FIG. 14A
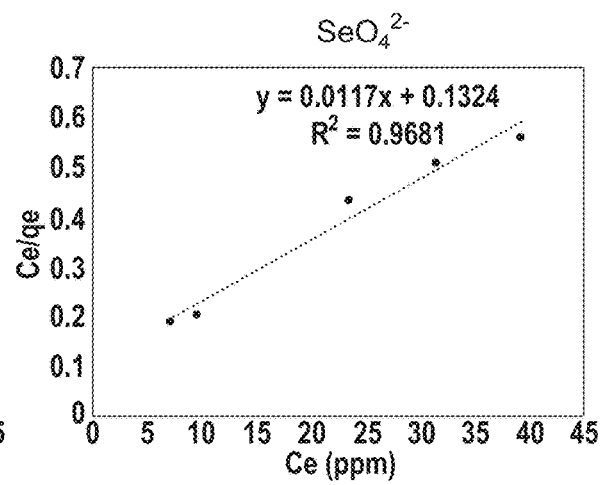
FIG. 14B
|  | $K_L$(L/mg) | Q(mg/g) | $R^2$ |
|---|---|---|---|
| $SeO_3^{2-}$ | 0.12 | 95 | 0.96 |
| $SeO_4^{2-}$ | 0.089 | 85 | 0.97 |
FIG. 14C

METAL-ORGANIC FRAMEWORKS FOR THE REMOVAL OF MULTIPLE LIQUID PHASE COMPOUNDS AND METHODS FOR USING AND MAKING SAME

CROSS REFERENCE TO RELATED APPLICATIONS

This application is a continuation of prior application Ser. No. 16/550,237, filed Aug. 25, 2019, which claims the benefit of U.S. Provisional Application No. 62/751,646, filed Oct. 28, 2018, and U.S. Provisional Application No. 62/723,121, filed Aug. 27, 2018, each of which is incorporated by reference herein in its entirety.

BACKGROUND OF THE INVENTION

Field of the Invention

The present invention and its embodiments relate to the removal of a given chemical species from a liquid. In particular, the present invention and its embodiments relate to the use of a metal-organic framework (MOF) having particular properties suitable for adsorption of certain anions, such as oxy-anions, and having a certain ligand attached for use in removing certain cations, such as lead and mercury, from a liquid or liquid stream, such as an industrial liquid stream. The present invention and its embodiments also relate to methods for attaching these MOFs to certain substrates and using the same. In particular, the present invention and its embodiments relate to methods for the attachment of the MOFs on various substrates, such as polypropylene beads, macroscopic fabrics, and molecular fabrics for use in the removal of certain chemical species from a liquid.

Description of Related Art

Nuclear utilities are challenged with the removal of several impurities that significantly contribute to or drive dose, radioactive waste generation, environmental effluent waste concerns, and materials degradation issues. Analogously, fossil-based power generation facilities are challenged by the regulatory discharge requirements for wastewater from flue gas desulfurization and from scrubber, fireside washing, and boiler cleaning operations, as well as by the mandates for groundwater remediation due to coal pile run-off and ash pond leachates. Current technologies (e.g., ion exchange) lack the ability to remove these impurities to the extent needed due to factors associated with the mechanism of capture and competition with other impurities.

Recently developed sequestration media offer organo-metallic ligands decorated on resin backbones (in the locations which would otherwise bear a cation exchange group) that are significantly improved removal media for analytes that are cations like cobalt. Unfortunately, such ligands cannot accommodate the larger geometry of oxy-anions of species like selenium that are found in the subject water streams. For example, ion exchange and adsorption technologies are typically used to capture chemical impurities in water streams. However, these technologies are subject to several significant drawbacks. They are non-specific (i.e., will capture many different species to some degree), subject to competition (i.e., higher concentration species will dominate), and are reversible (i.e., captured species will be released given changes in water conditions).

Removal of selenium from water streams is of particular interest. Selenium is a naturally occurring element that is essential, in low concentrations, for human health. Of all essential elements however, selenium has the most confining range between dietary deficiency (<40 µg/day) and toxicity (>400 µg/day). Selenium enters our waterways through a number of different sources such as agricultural runoff, mining, industrial production, and flue gas desulfurization processes. As a consequence of the narrow range between deficiency and toxicity, it is very important to monitor and control the amount of bioavailable selenium in our drinking water. The U.S. Environmental Protection Agency recognizes the dangers of selenium and has mandated the maximum acceptable level for selenium in drinking water to 50 ppb. However, in more recent proposals, regulatory plans to reduce selenium discharge requirements to 14 ppb and then as low as 10 ppb, making the present operation of many flue gas desulfurization wastewater cleanup facilities incapable of achieving such purity without methods beyond typical ion exchange or adsorption engineering unit operations.

Selenium can occur in both organic and inorganic forms, but the high solubility and hence bioavailability of inorganic species such as selenite ($SeO_3^{2-}$) and selenate ($SeO_4^{2-}$) makes these anions the primary focus of remediation techniques. Many techniques have been explored for the removal of selenite and selenate from water including the use of vertical flow wetlands and bioreactors, but high start-up costs and size requirements have limited the application of these techniques. An alternative approach that has been investigated involves using an adsorbing media to soak up and remove unwanted inorganic selenium. Iron oxides (hematite, goethite, and ferrihydrite) have been studied extensively as potential adsorbents for selenite and selenate in aqueous solutions. These iron-based materials have very low surface areas, meaning that a lot of the material is wasted due to the lack of available adsorption sites. Iron oxides also tend to be effective for selenite removal due to the formation of inner-sphere complexes between the selenite anion and iron oxide surface while selenate removal is not as sufficient because only weak, outer-sphere interactions occur.

In addition, removal of certain liquid phase cations from certain industrial liquid streams can be advantageous. Certain cations found in industrial wastewater streams may be environmental pollutants or deleterious to the industrial process, necessitating their removal from the corresponding liquid stream. For example, certain cations in wastewater and other liquid process streams associated with power generation processes, such as fossil and nuclear process coolants and service cooling water, may need to be removed.

For example, lead is believed to be involved in intergranular attack and stress corrosion cracking of steam generator tubes in nuclear power plants. Lead, which is highly soluble, is ubiquitous in the nuclear plant environment, with sources from welding, soldering, lubrication, the extensive use of lead material for radiation shielding, leading to lead contamination in steam generator feedwater. Lead is known to accelerate stress corrosion cracking of several different alloys (e.g., Alloy 600, 800, and 690) used in steam generator tubes. Moreover, nuclear utilities are pursuing life extension up to 80 years, and new PWR advanced light water reactor designs under construction will use steam generators tubes with 690TT (thermally treated) and 800NG (nuclear grade). In caustic solution, lead causes 690TT and 800NG tubes to actually be more susceptible to stress corrosion cracking than 600MA (mill annealed) tubes, which suffered from severe stress corrosion cracking degradation. Given the significant costs to address these detrimental effects of lead, reducing the amount of lead that comes in contact with steam generator tubes could reduce the risk of lead stress corrosion cracking.

Ion exchange is one method used for removal of cations from liquid streams. For example, ion exchange is used for aqueous cleanup of cationic lead ($Pb^{2+}$) from water streams typical of fossil and nuclear process coolants or service cooling water. However, it is difficult if not impossible to achieve removal that reduces the concentration of the cation in the liquid stream to ultra-low levels (e.g., part per billion or below). In some instances, removal using ion exchange medium is limited due to equilibrium leakage (i.e., the reverse of the uptake reaction). However, removal of cations to such ultra-low levels is necessary to meet technical specifications or discharge regulations. In addition, it should be appreciated that current US environmental protection regulations for lead limits in drinking water are extremely low for example, as low as 10 ppb.

However, achieving such removals of lead is difficult with typical adsorption medium. Even if ionic interactions predominate as with ion exchange, as the medium adsorbs analyte from the influent liquid stream, the analyte concentrates within the pores of the adsorption medium. As a result, the concentration gradient favorable to analyte transport reverses and begins driving the analyte back into the low concentration influent stream. This process is often termed "equilibrium leakage" from the uptake medium, and in the instance of ion exchange beds, it occurs near the outflow end of the bed. Accordingly, the lower the stream concentration desired, the more difficult achieving analyte uptake becomes.

Additionally, circumstances exist wherein a given liquid or liquid stream contains ionic impurities of both anionic and cationic charges. For example, amphoteric compounds, those that can take on either a positive or a negative charge bias depending on the environment in which they are found, are often found in industrial processes and in environmental cleanup processes. In the nuclear industry, steam generator water is one such environment. Depending acutely on temperature and on local acidity, the elemental lead in steam generator waters can find itself in a cationic (+2) and an oxy-anionic charged speciation, wherein both species are solvated by water molecules.

Therefore, a novel technology is needed that effectively and efficiently removes specific impurities, such as both certain anions and cations, from water and other liquid streams, such as industrial water-based streams. There is a need for such technology to remove these impurities in the presence of other competing species, or species that may compete for removal, thereby effectively reducing the removal efficiency of the species targeted for removal. There is also a need for such technology to remove these impurities in a manner that specifically targets capture of that impurity and minimizes any reversibility or release from capture, thereby holding it with a much higher binding energy. In particular, a different type of structural media is required to specifically address removal of low levels of particular species with high enough binding energy to maintain near irreversible uptake as analyte concentrations are lowered while competitor concentrations are simultaneously raised.

Accordingly, it would be advantageous to provide a novel technology that effectively and efficiently removes specific impurities, including both certain liquid phase anions, such as oxy-anions, including oxy-anions of selenium and others, and liquid phase cations, such a lead and mercury, from water and other liquid streams, such as other industrial water-based streams. Specifically, it would be beneficial to provide a chemical compound and process to remove both oxy-anions, including oxy-anions of selenium and others, and liquid phase cations, such as cationic lead and mercury.

More specifically, it would be beneficial to provide such a chemical compound that would reduce concentration of already low levels of particular species, such as aqueous oxy-anions of selenium, with high enough binding energy to maintain near irreversible uptake and concurrently provide for removal of lead in the liquid stream to ultra-low levels with minimal or no equilibrium leakage. It would also be advantageous to provide such a chemical compound that would provide a high uptake capacity for certain liquid phase cations, such as cationic lead and mercury, thereby reducing the liquid phase concentration of those cations to an ultra-low level with minimal or no equilibrium leakage.

It would also be beneficial to provide a process that utilizes such a chemical compound to remove both liquid phase anions, such as oxy-anions, including oxy-anions of selenium and others, and liquid phase cations, such a lead and mercury, from water and other liquid streams, such as other industrial water-based streams. For example, it would be beneficial to provide such a chemical compound and process to remove both liquid phase anions, such as oxy-anions, including oxy-anions of selenium and others, and liquid phase cations, such a lead and mercury from liquid streams in fossil or nuclear power plants. Specifically, it would be beneficial to provide a process that utilizes such a chemical compound to reduce the concentration of liquid phase anions, such as oxy-anions, including oxy-anions of selenium and others, and liquid phase cations, such as cationic lead and mercury, in a liquid stream to ppb levels or below with minimal or no equilibrium leakage.

However, in some cases, such MOFs can be expensive to manufacture making their use cost-prohibitive. Accordingly, there exists a need for methods that generates and provides the MOF in a manner that reduces its cost of use.

BRIEF SUMMARY OF THE INVENTION

In general, the present invention is directed to a metal-organic framework (MOF) for use in removing multiple liquid phase compounds, in particular both anionic and cationic species, from a liquid or liquid stream. In some embodiments, the MOF is a Zr-based MOF, such as NU-1000, having the ability to complex or adsorb certain anionic species and having an attached ligand for complexation with certain cationic species. The anionic species that may be removed include, for example, oxy-anions, such as oxy-anions of selenium, including selenite ($SeO_3^{2-}$) and selenate ($SeO_4^{2-}$); oxy-anions of antimony, including oxy-anions in either the Sb[III] (antimonite) or the Sb[V] (antimonate) redox state; and oxy-anions of lead, including oxy-anions in either the Pb[II] or the Pb[IV] redox state, such as $Pb(OH)_6^{2-}$, $Pb(OH)_6^{4-}$, $PbO_3^{2-}$, and $PbO_2^{2-}$. The cationic species that may be removed include, for example, divalent lead ($Pb^{2+}$) or mercury ($Hg^{2+}$) and similar cations. Accordingly, the MOF of the present invention provides for the capture or removal of both oxy-anions and cationic species from a given liquid or liquid stream. In general use, the process of the present invention includes contacting the MOF having an attached ligand for complexation with cationic species with a given liquid or liquid stream and adsorbing the various oxy-anions and complexing the various cations, thereby removing both from the liquid or liquid stream. It should be appreciated that the MOF with the ligand for complexation with cationic species can be used to remove whatever combination of anionic and cationic species are present in a given liquid stream.

The general formula for the MOF and the ligand structure is $R_1$—$SO_2$—S—$R_2$—SH, where $R_1$ is the MOF to which the ligand (—$SO_2$—S—$R_2$—SH) can be attached and where $R_2$ is an alkyl group that is either ethyl or propyl. In some embodiments, the present invention provides a chemical compound for complexing with both an oxy-anion and a liquid phase cation having the formula $R_1$—$SO_2$—S—$R_2$—SH, wherein $R_1$ comprises a zirconium-based metal-organic framework having a pendant group attached to an organic linker and $R_2$ comprises an alkyl. In some embodiments, the pendant group may be a pendant benzyl group.

In one embodiment, the MOF has a molecular formula of $Zr_6(\mu_3O)_4(\mu_3OH)_4(OH)_4(H_2O)_4(TBAPy)_2$, wherein TBAPy is 1,3,6,8-tetrakis (p-benzoic-acid)pyrene (known as NU-1000). Without being limited by theory, the preferred mechanism for complexation of the oxy-anion by the MOF is adsorption. In one embodiment, the adsorption of the oxy-anion by the MOF is through nodal uptake via the zirconium oxide/hydroxide nodal features of the MOF.

The ligand for complexation with cationic species attached to the MOF is a thiosulfonyl-thiol (—$SO_2$—S—$R_2$—SH, where $R_2$ is an alkyl group) ligand, also known as a thio-alkyl-sulfonyl-mercaptan ligand. This ligand may be attached to the MOF by any means known in the art provided that such does not significantly interfere with the MOF's ability to adsorb a particular anion. In some embodiments, this ligand may be attached to the MOF through a pendant group attached to the MOF. In some embodiments, the pendant group is attached to a linker of the MOF. It should be appreciated that multiple pendant groups, each attached to separate linkers of the MOF, can be used. It should be also appreciated that the sulfonyl group attached to the MOF is such that the thioalkyl group can be attached to the sulfonyl group on the MOF through nucleophilic attack. Therefore, any pendant group to which the sulfonyl group can be attached, and that itself can be attacked nucleophilically, can be used to attach the ligand of the present invention to the MOF. In some embodiments the pendant group is a pendant benzyl group attached to the MOF to which the sulfonyl (i.e., —$SO_2$—) functionality attaches.

In another embodiment, the present invention provides a method for reducing the concentration of a oxy-anions and a cation from a liquid stream, comprising contacting a liquid stream comprising an oxy-anion and a cation with a chemical compound having the formula $R_1$—$SO_2$—S—$R_2$—SH, wherein $R_1$ comprises a zirconium-based metal-organic framework having a pendant group attached to an organic linker and $R_2$ comprises an alkyl; complexing the oxy-anion with the zirconium-based metal-organic framework, thereby reducing the concentration of the oxy-anion in the liquid stream; and complexing the cation with the chemical compound, thereby reducing the concentration of the cation in the liquid stream. In another embodiment, the pendant group is a pendant benzyl group and wherein the oxy-anion complexes with a node of the zirconium-based metal-organic framework and wherein the cation complexes with a mercapto-sulfur of a thio-sulfonyl moiety of the chemical compound and a terminal mercaptan of the chemical compound to form a ring-like geometry.

The ability of the MOF having the attached ligand to reduce the concentrations of certain anions, such as oxy-anions, and certain cations, such as lead, in water provides many benefits. Removal of oxy-anions from a water stream, such as an industrial waste water stream, provides for a more environmentally acceptable water stream, particularly with respect to removal of selenate and selenite, as selenium can be toxic at certain levels in drinking water. Removal of cations, such as lead and mercury, from liquid streams may provide health and environmental benefits, given, for example, drinking water limits. In addition, removal of lead in fossil or nuclear power plant streams may have several beneficial effects including reduced stress corrosion cracking in certain materials in which the liquid stream comes in contact.

The present invention also describes methods for attaching certain MOFs to a substrate to form a MOF-containing product that can be used in numerous ways depending upon the specific MOF attached to the substrate. Accordingly, it should be appreciated that a particular MOF having a particular property, such as an affinity for a particular species to be removed from a given fluid, may be selected for attachment to the substrate. The substrate may be any substrate to which a given MOF may be attached, and the form and shape of the substrate may be selected based upon its ultimate use. For example, the configuration or shape of the substrate may be selected to allow use of the selected MOF in a given environment, such as a given industrial process or a given piece of equipment, and provide the proper exposure of the MOF in that environment, such as exposure of the MOF to a given fluid in a given process or piece of equipment.

It should be appreciated that the MOF may be any one of the MOFs described herein. For example, in one embodiment, the MOF may be a MOF capable of removing certain chemical species from a given fluid. For example, the MOF may be a MOF capable or configured to remove certain liquid phase species from a given liquid or liquid stream. In some embodiments, the MOF is a Zr-based MOF, such as NU-1000, for removal of certain anions, such as oxy-anions, from a liquid or liquid stream. In other embodiments, the MOF is a Zr-based MOF, such as NU-1000, configured for removal of certain cations from a liquid or liquid stream as described herein. In some embodiments, the MOF is a Zr-based MOF, such as NU-1000, configured for removal of both certain anions, such as certain oxy-anions, and certain cations from a liquid or liquid stream as described herein. In other embodiments, the MOF is a Zr-based MOF, such as NU-1000, having the ability to complex or adsorb certain anionic species and having an attached ligand for complexation with certain cationic species as described herein.

In one embodiment, the substrate may be any inert substrate to which the MOF may be attached. For example, the substrate may be inert polypropylene polymer resin beads, a macroscopic fabric such as a mesh material or mesh filter, a molecular fabric, or any other three-dimensional shaped substrate.

In one embodiment the MOF, including any of the MOFs described herein, such as a Zr-based MOF such as NU-1000 with or without the ligand for complexation with certain cationic species as described herein, may be attached to an inert substrate such as polypropylene polymer resin beads, a macroscopic fabric such as a mesh material or mesh filter, or a molecular fabric. In one embodiment for attaching the MOF, the substrate is initially subjected to atomic layer deposition of a metal oxide, such as aluminum oxide, titanium oxide, or zinc oxide, to the surface of the substrate. Separately, the MOF may be attached to CTAB in a solution that is then combined with the substrate with the metal oxide. This results in attachment of the MOF to the substrate and the production of a commercial product consisting of a substrate having an attached MOF. In another embodiment for attaching the MOF to the substrate, the MOF may be attached to beta-CD in a solution that is then combined with the substrate. This results in attachment of the MOF to the substrate via the beta-CD and the production of a commercial product consisting of a substrate having an attached MOF.

It should be appreciated the MOF-containing substrate, which may be a commercial product, may be used in numerous ways, depending upon the MOF selected for attachment to a given substrate. As noted above, in some embodiments, the MOF may be a MOF capable of removing certain chemical species from a given fluid. For example, the MOF may be a Zr-based MOF, such as NU-1000, configured for removal of certain anions, such as certain oxy-anions, and certain cations from a liquid or liquid stream. Specifically, NU-1000 is zirconium (Zr)-based and has a molecular formula of $Zr_6(\mu_3\text{-O})_4(\mu_3\text{O}H)_4(OH)_4(H_2O)_4(TBAPy)_2$, wherein TBAPy is 1,3,6,8-tetrakis (p-benzoic-acid)pyrene. NU-1000 can be used on a substrate to remove oxy-anions of selenium, including selenite ($SeO_3^{2-}$) and selenate ($SeO_4^{2-}$), as well as oxy-anions of antimony, including oxy-anions in either the Sb[III] (antimonite) or the Sb[V] (antimonate) redox state, and oxy-anions of lead, including oxy-anions in either the Pb[II] or the Pb[IV] redox state, such as $Pb(OH)_6^{2-}$, $Pb(OH)_6^{4-}$, $PbO_3^{2-}$, and $PbO_2^{2-}$. Further, the addition of certain ligands to these MOFs provides for the removal of certain cation species, such as divalent lead ($Pb^{2+}$) or mercury ($Hg^{2+}$) and similar cations. Accordingly, such MOFs with the attached ligand may provide the ability to concurrently remove both cationic and anionic species from a given liquid or liquid stream, such as power plant coolant or waste streams, including nuclear power plant liquid streams. In other embodiments, the MOF may be a Zr-based MOF used to remove certain chemical species, such as water, from a gas stream or air, including ambient air. Such MOFs may include MOF-801, 801-P, 802, 805, 806, 808, 812, and 841. In other embodiments, the MOF-containing substrate, which may be a commercial product, may be a Zr-based MOF, such as NU-1000, having the ability to complex or adsorb certain anionic species and having an attached ligand for complexation with certain cationic species as described herein.

It should be appreciated that the present invention provides numerous benefits. As noted above, the ability to select a given MOF based upon an intended use or need coupled with the ability to select or tailor the design of the substrate to which the MOF is attached, provides wide latitude in the overall design of the MOF-containing product. In addition, the placement of a MOF on inert substrates, such as a plurality of chemically inert polypropylene beads, a macroscopic fabric, or a molecular fabric, provides a platform or mechanism for exposing a MOF to a given fluid of interest and removing targeted species from that fluid. Given the capacity of a MOF to sorb a given quantity of a particular species or plurality of species from a fluid, placing the MOF on a given substrate, whose configuration or shape can be controlled to provide the proper exposure of the MOF to the fluid in a given environment, a lower quantity of MOF can be used, thereby significantly reducing the cost of the MOF used in any given process. Basically, porting expensive MOF particles onto inexpensive structures allows for the use of the MOFs in existing industrial structures without the need to produce enough MOF particles to fill the entire structure. For example, in some embodiments, the configuration of the substrate can be used to provide the necessary amount of surface exposure of the MOF to accomplish the desired results of using that MOF without the need to use a relatively large amount of pure MOF. Indeed, coating structures, such as polypropylene beads, a macroscopic fabric such as a mesh filter, or a molecular fabric, with a thin layer of MOF particles may result in a cost significantly below that of using MOF particles without any structural support. Such cost savings would enable bulk use of MOF particles in many industrial processes, including processes in both fossil fuel and nuclear power plants.

For example, placing MOFs on a support structure provides the ability to efficiently bring a given liquid being treated into contact with the MOF to allow for the uptake of the chemical species to be removed by the MOF. Coating of inert beads, such as polypropylene beads, with MOF enables a high degree of surface area contact between the MOFs and any liquid stream in which the beads are deployed. Accordingly, placement of the MOF on the surface of polypropylene beads provides the ability of MOF particles to bind chemical compounds in a liquid stream as the liquid stream is filtered through the MOF structure. Further, the use of MOF-coated inert structures, such as polypropylene beads, enables liquid contact between the MOFs and a flowing liquid stream without convection away from other MOF particles.

It should also be appreciated that the methods of the present invention for attaching the MOFs to a particular substrate and producing a commercial product similarly provides numerous benefits. As noted above, the ability to select a given MOF based upon an intended use or need coupled with the ability to select or tailor the design of the substrate to which the MOF is attached, provides wide latitude in the overall design of the MOF-containing product. In addition, the placement of a MOF on inert substrates, such as a plurality of chemically inert polypropylene beads, a macroscopic fabric, or a molecular fabric, provides a platform or mechanism for exposing a MOF to a given fluid of interest and removing targeted species from that fluid. Given the capacity of a MOF to sorb a given quantity of a particular species or plurality of species from a fluid, placing the MOF on a given substrate, whose configuration or shape can be controlled to provide the proper exposure of the MOF to the fluid in a given environment, a lower quantity of MOF can be used, thereby significantly reducing the cost of the MOF used in any given process. Basically, porting expensive MOF particles onto inexpensive structures allows for the use of the MOFs in existing industrial structures without the need to produce enough MOF particles to fill the entire structure. For example, in some embodiments, the configuration of the substrate can be used to provide the necessary amount of surface exposure of the MOF to accomplish the desired results of using that MOF without the need to use a relatively large amount of pure MOF. Indeed, coating structures, such as polypropylene beads, a macroscopic fabric such as a mesh filter, or a molecular fabric, with a thin layer of MOF particles may result in a cost significantly below that of using MOF particles without any structural support. Such cost savings would enable bulk use of MOF particles in many industrial processes, including processes in both fossil fuel and nuclear power plants.

For example, placing MOFs on a support structure provides the ability to efficiently bring a given liquid being treated into contact with the MOF to allow for the uptake of the chemical species to be removed by the MOF. Coating of inert beads, such as polypropylene beads, with MOF enables a high degree of surface area contact between the MOFs and any liquid stream in which the beads are deployed. Accordingly, placement of the MOF on the surface of polypropylene beads provides the ability of MOF particles to bind chemical compounds in a liquid stream as the liquid stream is filtered through the MOF structure. Further, the use of MOF-coated inert structures, such as polypropylene beads, enables liquid contact between the MOFs and a flowing liquid stream without convection away from other MOF particles.

BRIEF DESCRIPTION OF THE SEVERAL VIEWS OF THE DRAWINGS

FIG. 8A illustrates DRIFTS spectrum of as-synthesized NU-1000 (lower trace) and after adsorption of two molecules of selenite (middle trace) and selenate (upper trace);

FIG. 8B illustrates DRIFTS spectrum blown up from 4000-2000 $cm^{-1}$;

FIG. 8C illustrates potential binding modes of selenate (or selenite) to the node of NU-1000;

FIG. 9A illustrates calculated differential pair distribution functions (PDFs) for selenite and selenate-loaded NU-1000;

FIG. 9B illustrates experimental differential PDFs for selenite and selenate-loaded NU-1000 only showing peaks at distances matching $\eta_2\eta_2$ binding;

FIGS. 14A-C illustrate a Langmuir plot (linear, type I) for selenite and selenate adsorption on NU-1000, with adsorbed amount as the weight of the full oxy-anions;

DETAILED DESCRIPTION OF THE INVENTION

Figure 1:
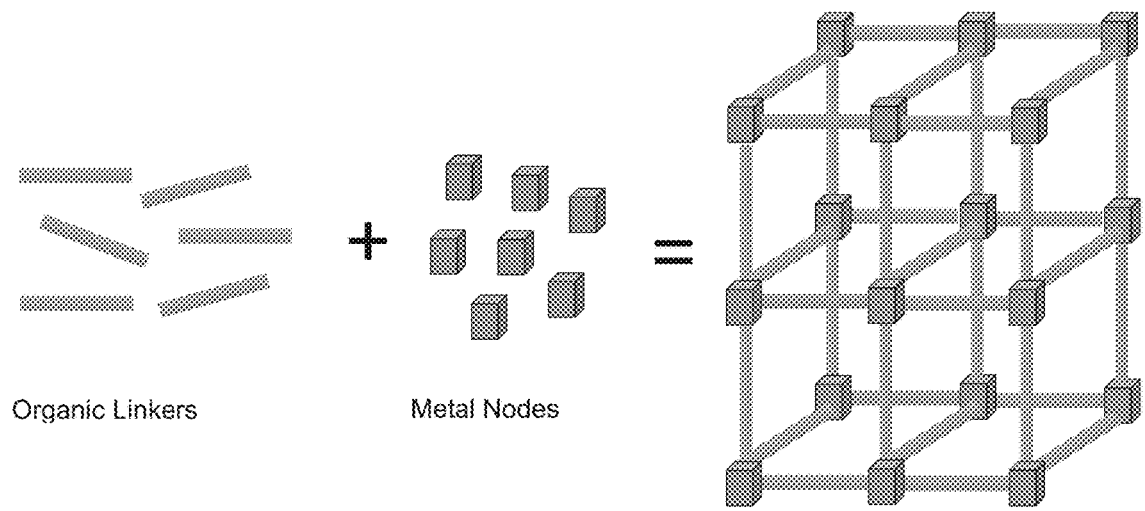
FIG. 1 illustrates a metal organic framework (MOF) according to one embodiment of the present invention.

The present invention is more fully described below with reference to the accompanying drawings. While the invention will be described in conjunction with particular embodiments, it should be understood that the invention can be applied to a wide variety of applications, and the description herein is intended to cover alternatives, modifications, and equivalents within the spirit and scope of the invention and the claims. Accordingly, the following description is exemplary in that several embodiments are described (e.g., by use of the terms "preferably," "for example," or "in one embodiment"), but this description should not be viewed as limiting or as setting forth the only embodiments of the invention, as the invention encompasses other embodiments not specifically recited in this description. Further, the use of the terms "invention," "present invention," "embodiment," and similar terms throughout this description are used broadly and are not intended to mean that the invention requires, or is limited to, any particular aspect being described or that such description is the only manner in which the invention may be made or used. It should be appreciated that certain of the accompanying drawings are not drawn to scale and are not intended to represent any specific three-dimensional conformation of the chemical compounds or complexes shown.

In general, the present invention is directed to a metal-organic framework (MOF) for use in removing multiple liquid phase compounds, in particular both anionic and cationic species, from a liquid or liquid stream. In some embodiments the MOF has an attached ligand such that the MOF itself has the ability to complex or adsorb certain anionic species and the attached ligand has the ability to complex with certain cationic species. The anionic species that may be removed include, for example, oxy-anions, such as oxy-anions of selenium, including selenite ($SeO_3^{2-}$) and selenate ($SeO_4^{2-}$); oxy-anions of antimony, including oxy-anions in either the Sb[III] (antimonite) or the Sb[V] (antimonate) redox state; and oxy-anions of lead, including oxy-anions in either the Pb[II] or the Pb[IV] redox state, such as $Pb(OH)_6^{2-}$, $Pb(OH)_6^{4-}$, $PbO_3^{2-}$, and $PbO_2^{2-}$. The cationic species that may be removed include, for example, divalent lead ($Pb^{2+}$) or mercury ($Hg^{2+}$) and similar cations.

Accordingly, the MOF of the present invention provides for the capture or removal of both oxy-anions and cationic species from a given liquid or liquid stream. In general use, the process of the present invention includes contacting the MOF having an attached ligand for complexation with cationic species with a given liquid or liquid stream and adsorbing the various oxy-anions and complexing the various cations, thereby removing both from the liquid or liquid stream. It should be appreciated that the MOF with the ligand for complexation with cationic species can be used to remove whatever combination of anionic and cationic species are present in a given liquid stream.

It should also be appreciated that MOF with the ligand for complexation with cationic species can be used to remove amphoteric compounds, or those that can take on either a positive or a negative charge bias depending on the environment in which they are found. For example, a lead oxy-anion and a lead cation may be adsorbed by a MOF suitably functionalized by the ligand. As described below, the NU-1000 zirconium MOF can be used to adsorb lead oxy-anions in solution via a nodal uptake mechanism. Simultaneously, if the lead cationic uptake ligand were available on the internal surface of the MOF cavity, then cationic lead could be removed within the MOF cavity while the anionic oxy-anion form could be removed on the zirconium nodal structures.

In some embodiments, the MOF is a Zr-based MOF, such as NU-1000. In one embodiment, the MOF has a molecular formula of $Zr_6(\mu_3O)_4(\mu_3OH)_4(OH)_4(H_2O)_4(TBAPy)_2$, wherein TBAPy is 1,3,6,8-tetrakis (p-benzoic-acid)pyrene (known as NU-1000). Without being limited by theory, the preferred mechanism for complexation of the oxy-anion by the MOF is adsorption. In one embodiment, the adsorption of the oxy-anion by the MOF is through nodal uptake via the zirconium oxide/hydroxide nodal features of the MOF.

The ligand for complexation with cationic species attached to the MOF is a thiosulfonyl-thiol ($-SO_2-S-R_2-SH$, where $R_2$ is an alkyl group) ligand, also known as a thio-alkyl-sulfonyl-mercaptan ligand. This ligand may be attached to the MOF through a pendant group attached to the MOF. In some embodiments, the pendant group is attached to a linker of the MOF. It should be appreciated that multiple pendant groups, each attached to separate linkers of the MOF, can be used. It should be also appreciated that the sulfonyl group attached to the MOF is such that the thioalkyl group can be attached to the sulfonyl group on the MOF through nucleophilic attack. Therefore, any pendant group to which the sulfonyl group can be attached, and that itself can be attacked nucleophilically, can be used to attach the ligand of the present invention to the MOF. In some embodiments the pendant group is a pendant benzyl group.

It should be appreciated that appropriate pendant groups can be attached to the linker portions of the MOF using solvent assisted linker exchange (SALE) or solvent assisted ligand incorporation (SALI) (see for example, P. Deria, W. Bury, J. T. Hupp and O. K. Farha, "Versatile Functionalization of the NU-1000 Platform by Solvent-Assisted Ligand Incorporation," *Chem. Commun.* 2014, 50, 1965-1068; and, P. Deria, J. E. Mondloch, O. Karagiardi, W. Bury, J. T. Hupp and O. K. Farha, "Beyond Post-Synthesis Modification: Evolution of Metal-Organic Frameworks via Building Block Replacement," *Chem. Soc. Rev.,* 2014, 43, 5896-5912). Accordingly, SALE or SALI can be used to attach pendant benzyl groups to various positions on the MOF, including the organic linker portions. In one embodiment, pendant benzyl groups can be created by attaching a phenyl group to the linker portion of the MOF via a styrene bond (e.g., [MOF]-HC=C—CH-phenyl). In some embodiments, SALE may be used to place the pendant benzyl group within or inside of the MOF structure, such as in the middle or approximately in the middle, of the MOF, as opposed to, in some embodiments, using SALI to place the pendant benzyl group near the aperture of the MOF structure.

Accordingly, the general formula for the MOF and the ligand structure is $R_1-SO_2-S-R_2-SH$, where $R_1$ is the MOF having an appropriate pendant group to which the ligand ($-SO_2-S-R_2-SH$) can be attached and where $R_2$ is an alkyl group that is either ethyl or propyl. In one embodiment, the ligand is attached to the MOF via a pendant group that is a pendant benzyl group attached to the MOF to which the sulfonyl (i.e., $-SO_2-$) functionality attaches.

With respect to the complexation of the cationic species with the ligand attached to the MOF for complexation with cationic species, it should be appreciated that an important aspect of the ligand is the synthesis of the $-SO_2-S-$ bond, i.e., the S—S bonding between the thio-alkyl and the sulfonyl moieties. This provides a ligand having a mercapto-sulfur of the thio-sulfonyl moiety and a terminal mercaptan moiety (—SH). As described below, a cation such as lead is complexed through a bis-sulfur interaction with the ligand in which the lead cation ($Pb^{2+}$) complexes with the mercapto-sulfur of the thio-sulfonyl moiety and to the terminal mercaptan moiety (—SH), which essentially "backbites" the lead cation ($Pb^{2+}$) thereby forming five or six member open rings or ring-like geometries, depending upon whether the $R_2$ alkyl group is ethyl or propyl, respectively. The complexation of the cation with the ligand may also be referred to as an ionic interaction or chemisorption, which occurs through the positive charge on the cation and the electronegativity of the mercapto-sulfur of the thio-sulfonyl moiety and a terminal mercaptan moiety. Accordingly, it should be appreciated that cations other than lead may be complexed using the ligand of the present invention. For example, cations that are similar to lead ($Pb^{2+}$), such as cationic mercury, may be complexed in a similar fashion.

Accordingly, the MOF with the ligand for complexation with cationic species attached to the MOF provides a method or process for removing oxy-anions and certain cationic species, such as those described above, from a liquid stream, such as an industrial process liquid stream, including, for example, a wastewater stream. Generally, the liquid or liquid stream is brought into contract with the MOF having the ligand for complexation with cationic species attached, resulting in the adsorption of the oxy-anions and the complexation of the cation species by the MOF and, accordingly, their removal from the liquid or liquid stream. The ability of the MOF, such as NU-1000, to reduce the concentration of the oxy-anion in water provides for a more environmentally acceptable water stream. In addition, without being limited by theory, it is believed that the complexation of the cationic species by the ligand attached to the MOF through the mercapto-sulfur of the thio-sulfonyl moiety and the backbiting terminal mercaptan moiety provides the ability to remove significant amounts of the cation from a given liquid, resulting in the ability to achieve extremely low concentrations of the given cation within the liquid or liquid stream.

FIG. 1 illustrates a MOF according to one embodiment of the present invention. MOFs are structurally diverse, porous materials that are constructed from metal nodes bridged by organic linkers. MOFs are composed of multi-functional organic linkers and metal-based nodes that are interconnected by coordination bonds of moderate strength. In terms of adsorption or complexation of analyte molecules from aqueous solutions, MOFs containing zirconium metal nodes are of interest due to their inherent stability over a wide pH range in water. This stability arises from the strong Zr(IV)-O bonds, which also makes these frameworks mechanically and thermally robust to temperatures >500° C. MOFs in aqueous solution are appropriate candidate materials in either pre-coatable filter/demineralizer applications or independent packed column separation applications, which may also be consistent with use in vessels already in existence with a given plant, such as a nuclear power plant (e.g., vessels already in use for ion exchange) or a fossil fueled electricity generation plant's flue gas desulfurization wastewater treatment facility.

While the MOF may be usable in such liquid flow applications in its native structure, it is possible that the amount of pressure required to permeate packed beds of such small particles (typical size ranging from 75 to 1200 nanometers with 5 micron crystallites forming from the MOF particles) may exceed available fluid driving equipment, meaning that the MOF particles may need to be ported upon some other larger particle carrier (more of the order of a resin particle, typically 50 to 850 microns diameter in powder or bead form) such that fluid may permeate conglomerates of carrier particles more easily. One of ordinary skill in the art ought to be able to construct multiple methodologies for contacting the MOF particles onto some suitable carrier particle such that the hydraulic permeability of a conglomerate of such carrier particles, either in a columnar flow through a bed of such carrier particles or a flow through a filter providing a porous surface onto which such carrier particles are coated, is sufficiently high to afford the required fluid volumetric throughput. As such, the adsorptive properties of the MOF will still manifest since the MOF itself will be exposed to the analyte in the water stream as it flows about the carrier particles onto which the MOF media are attached.

Figure 2:
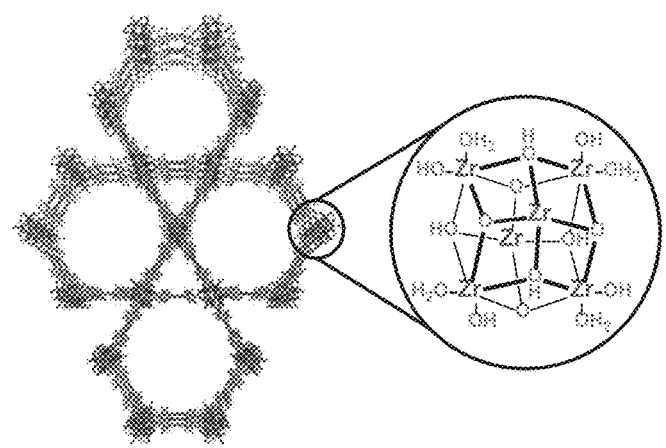
FIG. 2 illustrates a particular MOF, NU-1000.

FIG. 2 illustrates a particular MOF, NU-1000. NU-1000 is a Zr-based MOF and has the molecular formula of $Zr_6(\mu_3\text{-}O)_4(\mu_3OH)_4(OH)_4(H_2O)_4(TBAPy)_2$, wherein TBAPy is 1,3,6,8-tetrakis (p-benzoic-acid)pyrene that can be used as the MOF in the present invention. The parent-framework node of this MOF consists of an octahedral $Zr_6$ cluster capped by four $\mu_3$-OH and four $\mu_3$-O ligands. Eight of the twelve octahedral edges are connected to TBAPy units, while the remaining Zr coordination sites (after activation) are occupied by four terminal —OH and four terminal —$OH_2$ ligands. The 3D structure can be described as 2D Kagome sheets linked by TBAPy ligands. Two of the four terminal —OH groups point into the mesoporous channels, while the remaining terminal hydroxyls lie in smaller apertures between the Kagome sheets.

Figure 3:
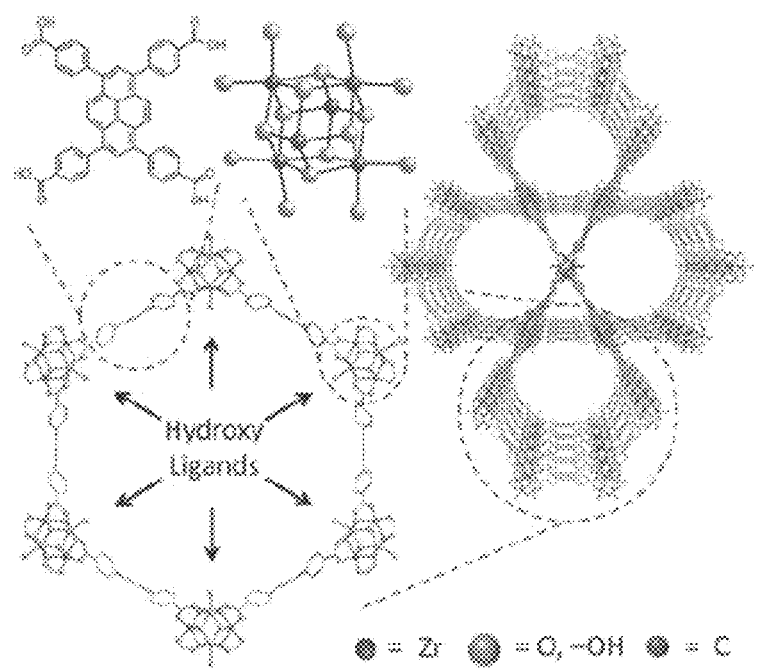
FIG. 3 illustrates structural features of the MOF, NU-1000 of FIG. 2.

FIG. 3 illustrates structural features of the MOF, NU-1000 of FIG. 2. Further features of this MOF and its synthesis technique are described in Mondloch, J E, W Bury, D Fairen-Jimenez, S Kwon, E J DeMarco, M H Weston, AA Sarjeant, S T Nguyen, P C Stair, R Q Smurr, O K Farha and J T Hupp, "Vapor-Phase Metalation by Atomic Layer Deposition in a Metal-Organic Framework", J. Am. Chem. Soc. (2013) 135, 10294-10297, which is incorporated herein by reference in its entirety. For example, synthesis of the organic linker of NU-1000 involves two steps: a Suzuki coupling between 1,3,6,8-tetrabromopyrene and 4-(ethoxycarbonyl)phenyl)boronic acid followed by hydrolysis of the resulting tetraester compound to give the tetracarboxylic acid linker, 1,3,6,8-tetrakis(p-benzoic acid)-pyrene. To synthesize NU-1000, the $Zr_6$-cluster nodes are first formed by reacting zirconyl chloride octahydrate with excess benzoic acid modulator for 1 hour at 80° C. in N,N-dimethylformamide. After cooling the reaction mixture to room temperature, 0.2 equivalents of the 1,3,6,8-tetrakis(p-benzoic acid)-pyrene linker are added and the mixture is heated at 100° C. for 24 hours to give benzoic acid capped NU-1000. To remove the benzoic acid ligands and reveal the terminal —OH and —OH2 on the nodes, the MOF is activated with 8M HCl for 24 hours. It should also be appreciated that less pure starting materials of $ZrOCl_2 \cdot 8H_2O$ and $HfOCl_2 \cdot xH_2O$ to reduce the costs of manufacture of the NU-1000. For example, 99.99% pure $ZrOCl_2 \cdot 8H_2O$ and $HfOCl_2 \cdot xH_2O$ cost approximately 400% more than the 98% pure precursors.] Also, structural features of this MOF are described in Planas, N.; Mondloch, J. E.; Tussupbayev, S.; Borycz, J.; Gagliardi, L.; Hupp, J. T.; Farha, O. K.; Cramer, C. J. Defining the Proton Topology of the $Zr_6$-Based Metal-Organic Framework NU-1000. J. Phys. Chem. Lett. 2014, 5, 3716-3723, which is incorporated herein by reference in its entirety.

Bare NU-1000 has surprisingly been found to complex with oxy-anions of selenium, including selenite ($SeO_3^{2-}$) and selenate ($SeO_4^{2-}$), in aqueous solutions. Results to date indicate that oxy-anions of selenium bond with significant strength so as to remove those anions down to 20 ppb levels in simple continuous stirred tank environments within reasonably and relatively fast times and to even lower concentrations, such as 10 ppb and lower, 6 ppb and lower, and 2 ppb and lower in other embodiments. The bonding for selenate and selenite are shown to be to the zirconium nodes of the MOF directly, without worry for the ligand interactions with the MOF cavity. It should be appreciated that the ability of NU-1000 to complex with selenite and selenate has been accomplished without the need for modifying the structure of NU-1000, for example, by functionalizing NU-1000 through metalation using atomic layer deposition (ALD), through solvent-assisted linker exchange (SALE), nor through solvent-assisted ligand incorporation (SALI).

Figure 7:
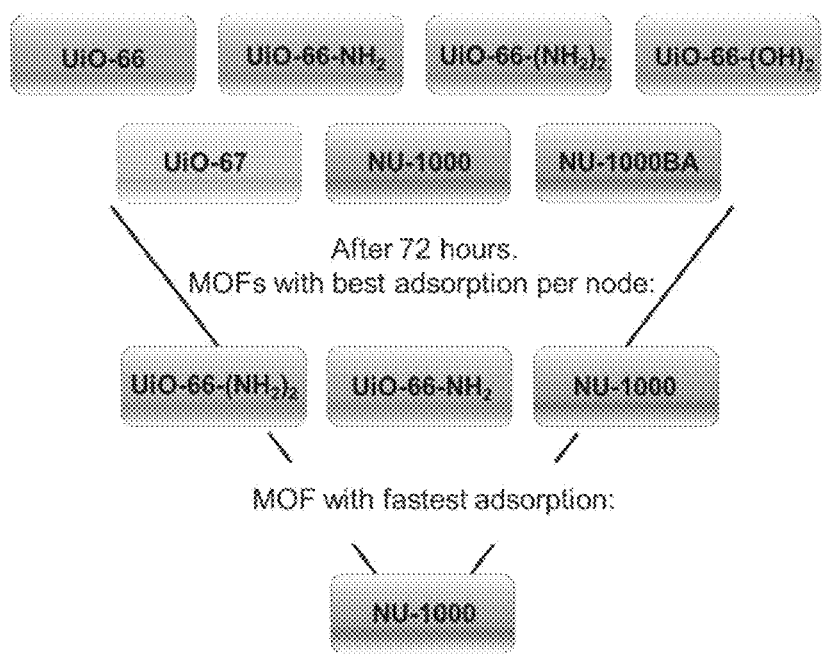
FIG. 7 illustrates a flow chart outlining the screening process for selenate and selenite adsorption in Zr-based MOFs.

Specifically, a series of zirconium-based MOFs were tested for their ability to adsorb and remove selenate and selenite anions from aqueous solutions. MOFs were tested for adsorption capacity and uptake time at different concentrations. (FIG. 7 is a flow chart outlining the screening process for selenate and selenite adsorption in Zr-based MOFs.) NU-1000 was shown to have the highest adsorption capacity, and fastest uptake rates for both selenate and selenite, of all zirconium-based MOFs in this testing.

Different ratios of adsorbent:adsorbate were tested to understand how the ratio affects uptake. Samples of 2, 4, 6, and 8 mg of NU-1000 were exposed to 10 mL solutions containing 1000 ppb Se as either $SeO_4^{2-}$ or $SeO_3^{2-}$. At all the adsorbent:adsorbate ratios tested, 98.3% or more of the $SeO_3^{2-}$ in solution is adsorbed leaving an average of 10-17 ppb in solution. Similarly, at all adsorbent:adsorbate ratios tested, 97.7% or more of the $SeO_4^{2-}$ in solution is adsorbed leaving an average of 20-23 ppb in solution. In general, these experiments show that changing the adsorbent:adsorbate ratio by 4×, at these concentration levels, does not have a significant impact on the total Se adsorbed from solution. It should be noted that throughout testing NU-1000 for Se uptake, for example studies performed at pH 6 and analogous batch studies performed using 100 ppb Se starting concentrations instead of 1000 ppb, remnant Se concentrations less than 10 ppb (down to 6 ppb and 2 ppb) have been observed when exposing 2 mg of NU-1000 to 1000 ppb and 100 ppb Se respectively. In such embodiments, the present invention may be used to reduce the total selenium concentration (i.e., the total of all selenium species) to less than 10 ppb or the amount set for suitable drinking water standards. Accordingly, the present invention may reduce the total Se concentration in a given liquid or liquid stream by more than 90%, by more than 94%, and by more than 98% in some embodiments.

Figure 4A:
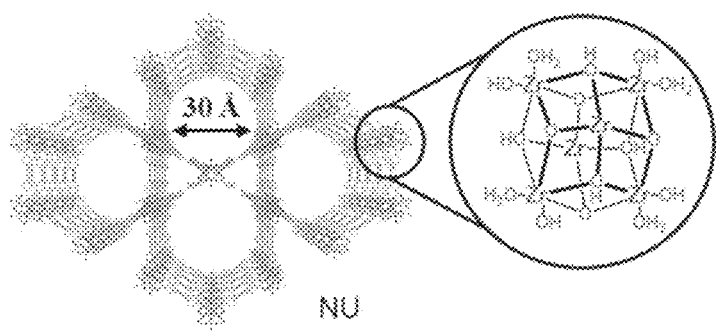
FIG. 4A illustrates a structure of NU-1000 highlighting the hexagonal pore size and the structure of the $Zr_6$ node.
Figure 4B:
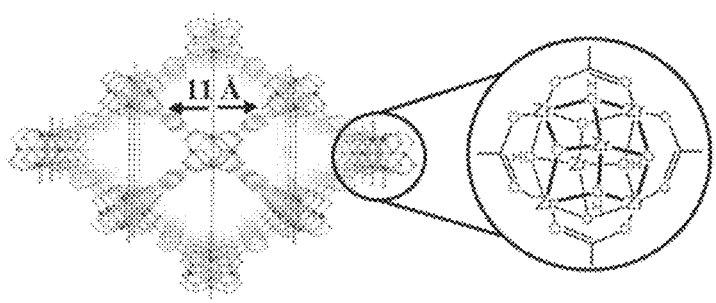
FIG. 4B illustrates a structure of UiO-66 highlighting the octahedral pore size and the structure of the $Zr_6$ node.
Figure 5:
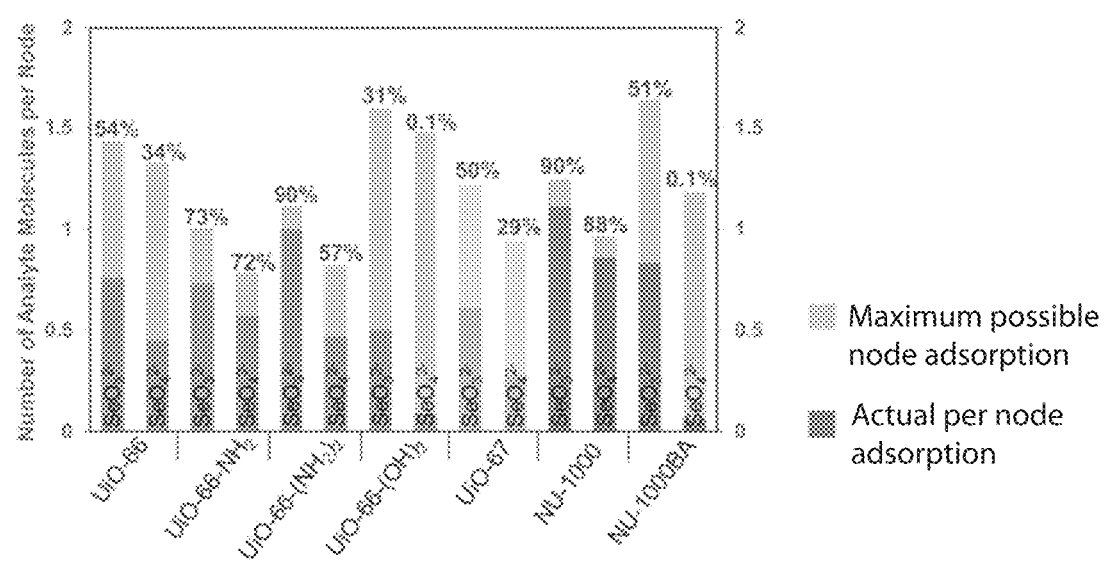
FIG. 5 is a bar graph illustrating the number of selenate or selenite molecules adsorbed per node in a series of Zr-based MOFs.

FIG. 4A illustrates a structure of NU-1000 highlighting the hexagonal pore size and the structure of the $Zr_6$ node. FIG. 4B illustrates a structure of UiO-66 highlighting the octahedral pore size and the structure of the $Zr_6$ node. Metal-organic frameworks from the NU-1000 (FIG. 4A), UiO-66 (FIG. 4B), and UiO-67 families were screened for their selenate and selenite uptake ability. For initial screening, two samples of each MOF were exposed separately to aqueous solutions of either selenate (100 ppm Se) or selenite (100 ppm Se). After 72 hours of exposure, UiO-66 adsorbed 54% and 34% of the selenite and selenate present in the respective solutions, suggesting that anion exchange is occurring both on, and within, the MOF. This demonstrates that Zr-bound hydroxides in a MOF are useful for adsorption of selenium oxy-anions, despite the strongly bridging nature of the OH group in the nodes of UiO-66. Furthermore, anion exchange appears to be enhanced by the presence of Lewis/Brønsted basic amine groups on the terephthalic acid linker with UiO-66-$(NH_2)_2$ and UiO-66-$NH_2$ showing some of the highest selenate and selenite adsorption per $Zr_6$-node among the MOFs studied (FIG. 5). Without being bound by theory, this is likely a consequence of hydrogen bonding interactions between the amine groups and selenate and selenite anions, similar to hydrogen bonding motifs in amine-containing macrocyclic frameworks which have high affinities for sulfate and selenate anions.

FIG. 5 is a bar graph illustrating the number of selenate or selenite molecules adsorbed per node in a series of Zr-based MOFs. FIG. 5 shows that of the seven MOFs examined, NU-1000 achieves the highest degree of uptake of selenate as well as selenite, both gravimetrically and on a per-node basis. It also accomplishes the most complete removal of these ions from a 100 ppm Se test solution, i.e. 88% ($SeO_4^{2-}$) and 90% ($SeO_3^{2-}$). These results underscore the value and importance of MOFs with non-structural-ligand lability in accomplishing anion uptake.

Again, without being bound by theory, an alternative mode of uptake could conceivably be adsorption of the selenate/selenite sodium salt through, for example, oxy-selenium-anion/node-aqua(hydroxy) hydrogen bonding. ICP-OES (inductively coupled plasma-optical emission spectroscopy) measurements reveal no sodium adsorption in the MOF, indicating that the adsorbates cannot be salts and implying that each adsorbed oxy-selenium di-anion must be charge-balanced by loss of two anionic ligands (presumably hydroxides) from the MOF. ICP-OES measurements additionally established that no zirconium is lost to solution.

Figure 6:
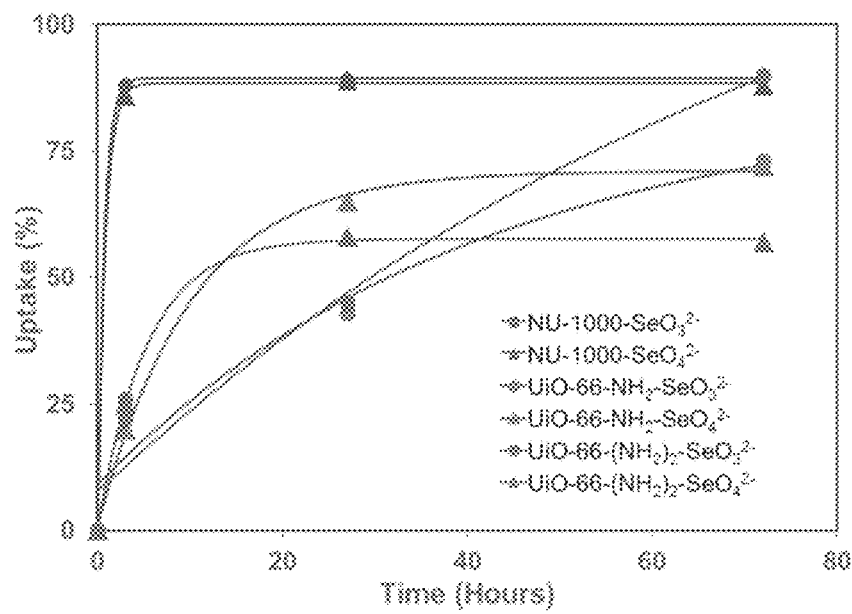
FIG. 6 is a graph illustrating the kinetics of selenate and selenite uptake in NU-1000, UiO66-$NH_2$ and UiO66-$(NH_2)_2$.

FIG. 6 is a graph illustrating the kinetics of selenate and selenite uptake in NU-1000, UiO66-$NH_2$ and UiO66-$(NH_2)_2$. Given the high capacities of UiO-66-$NH_2$, UiO-66-$(NH_2)_2$, and NU-1000 for selenate and selenite, the kinetics of $SeO_x^{2-}$ uptake were also evaluated. As shown in FIG. 6, limiting high-capacity uptake from 100 ppm solutions required ca. 70 hours or more with UiO-66-$(NH_2)_2$, about 27 hours with UiO-66-$NH_2$, and less than 3 hours with NU-1000. The faster uptake by NU-1000 compared with UiO-66 and its derivatives is likely related to aperture and pore size. NU-1000 has triangular and hexagonal pores, which are 12 Å and 30 Å in diameter, respectively, with apertures of the same size (FIG. 4A), while UiO-66 comprises tetrahedral and octahedral pores that are 8 Å and 11 Å in diameter, respectively, with an aperture of 7 Å. (FIG. 4B shows the octahedral pore.) The apertures of UiO-66-$NH_2$ and UiO-66-$(NH_2)_2$ are anticipated to be even smaller. Selenate and selenite anions have radii of 2.4 Å and 2.6 Å, respectively. Therefore, based on pore size vs. analyte size alone, one would expect diffusion of selenate and selenite through the pores of NU-1000 to be faster than diffusion within UiO-66 derivatives.

Notable features for both NU-1000 and UiO-66-$NH_2$ are their ability to take up selenate and selenite with essentially equal efficacy—both kinetically and in terms of uptake capacity. The ability to adsorb both forms of inorganic selenium is an important feature for selenium remediation. The high adsorption capacity combined with fast uptake time using NU-1000 suggests that both aperture size and the presence of substitutable ligands (aqua and hydroxy groups) on the $Zr_6$ node may be important for attaining high uptake capacity and fast uptake kinetics.

Examination of the periodic table of elements would suggest that oxy-anions of the following elements might also be expected to be taken up by such MOFs like NU-1000 in a manner analogous to selenium, namely, oxy-anions of aluminum (that is, water soluble aluminum oxides/hydroxides), silicon (that is, silicates and hydrosilicates), phosphorus (such as phosphates and hydrophosphates), sulfur (that is, sulfates), chlorine (such as chlorates and perchlorates), geranium (that is, water soluble oxides/hydroxides of geranium), arsenic (such as, arsenates), tin (that is, stannates), antimony (such as antimonates and antimonites), iodine (such as iodates, per-iodates and iodites), and lead (that is, water soluble oxides/hydroxides of lead).

To gain insight into the mechanism(s) of selenate and selenite adsorption on NU-1000, maximum adsorption capacities per $Zr_6$ node were determined. When exposed to aqueous solutions containing various concentrations of selenate and selenite anions ranging from 2-7 per node, the maximum adsorption capacity of NU-1000 was found to be two anions per node (Table S1). In addition, the affinities of NU-1000 for selenate and selenite are similar under these conditions, suggesting perhaps that the two analytes are bound in a similar fashion. At initial concentrations corresponding to more than six per node (>90 ppm Se for the solution volume and the amount of sorbent examined), NU-1000 is shown to take up more than two anions per node with concomitant adsorption of sodium cations. This adsorption of sodium shows that NU-1000 can no longer inherently charge balance when adsorption beyond two anions per node occurs. In the absence of $Na^+$ co-incorporation, for each doubly-charged selenate or selenite anion adsorbed, two negative charges must be given up by the MOF to maintain charge balance. One way for NU-1000 to accommodate two selenate or selenite anions per node (−4 charge) would be to substitute all four terminal hydroxyl groups ($OH^-$) from the $Zr_6$ node; as detailed below there is likely a substitution of water molecules as well (FIG. 4A).

TABLE S1

Selenite and selenate adsorption per node in NU-1000 when exposed to various concentrations of aqueous sodium selenate and sodium selenite.

|  | Exposure-Per Node | Uptake-Per Node |
|---|---|---|
| NU-1000- $SeO_3^{2-}$ | 2 | 1.5 |
| NU-1000- $SeO_4^{2-}$ |  | 1.3 |
| NU-1000- $SeO_3^{2-}$ | 3 | 1.8 |
| NU-1000- $SeO_4^{2-}$ |  | 1.8 |
| NU-1000- $SeO_3^{2-}$ | 4 | 1.7 |

TABLE S1-continued

Selenite and selenate adsorption per node in NU-1000 when exposed to various concentrations of aqueous sodium selenate and sodium selenite.

|  | Exposure-Per Node | Uptake-Per Node |
|---|---|---|
| NU-1000- $SeO_4^{2-}$ |  | 2.4* |
| NU-1000- $SeO_3^{2-}$ | 5 | 1.8 |
| NU-1000- $SeO_4^{2-}$ |  | 2.0 |
| NU-1000- $SeO_3^{2-}$ | 6 | 2.2 |
| NU-1000- $SeO_4^{2-}$ |  | 1.7 |
| NU-1000- $SeO_3^{2-}$ | 7 | 4.3* |
| NU-1000- $SeO_4^{2-}$ |  | 3.4* |

*$Na^+$ was also adsorbed.

Diffuse reflectance infrared Fourier transform spectroscopy (DRIFTS) was used to gain insight into the location of the two analyte molecules per node of NU-1000. FIG. 8A illustrates DRIFTS spectrum of as-synthesized NU-1000 (lower trace) and after adsorption of two molecules of selenite (middle trace) and selenate (upper trace). FIG. 8B illustrates DRIFTS spectrum blown up from 4000-2000 cm$^{-1}$. FIG. 8C illustrates potential binding modes of selenate (or selenite) to the node of NU-1000. Prior to analyte adsorption, the IR spectrum of NU-1000 contains a sharp peak at 3670 cm$^{-1}$ (FIG. 8A/B, lowest trace) corresponding to stretching of the nodes' terminal —OH groups (FIG. 4a). The spectrum also contains a small peak at 2745 cm$^{-1}$ (FIG. 8A/B lower trace) corresponding to O—H stretches from hydrogen-bonding between the aqua and hydroxyl ligands in the $Zr_6$-node (FIG. 4A). After adsorption of ca. two molecules of selenate or selenite per node, the O—H stretch at 3670 cm$^{-1}$ is greatly diminished and the hydrogen-bonding based O—H stretch at 2745 cm$^{-1}$ disappears completely (FIG. 8A/B, middle and upper traces, respectively). Based on this information, it is reasonable to suggest that each $SeO_4^{2-}$ or $SeO_3^{2-}$ anion replaces two terminal hydroxyl groups on the $Zr_6$-node. Therefore, when two analyte molecules are bound per node, all four terminal hydroxyl groups are replaced and analyte binding can occur in a $\eta_2\mu_2$ or $\mu_2$ fashion (FIG. 8C).

Pair distribution function (PDF) analyses of X-ray total scattering data were used to evaluate the structural changes accompanying binding of selenate and selenite anions. FIG. 9A illustrates calculated differential pair distribution functions (PDFs) for selenite and selenate-loaded NU-1000. FIG. 9B illustrates experimental differential PDFs for selenite and selenate-loaded NU-1000 only showing peaks at distances matching $\eta_2\mu_2$ binding. Simulated PDFs indicate Se—Zr distances of 3.41 Å and 2.72 Å, respectively, for $\eta_2\mu_2$ and $\mu_2$ binding (FIG. 9A). The experimental PDF results, evaluated from difference data so as to isolate atom-atom distances unique to the adsorbent/adsorbate combination, showed a feature at ~3.4 Å (3.36 Å for selenite, 3.37 Å for selenate), but not at 2.7 Å, clearly indicating that these anions exclusively bind in an $\eta_2\mu_2$ mode (FIG. 9B, wherein the curve for selenite begins higher on the left side). Both differential PDFs show peaks at ~1.7 Å assignable to the Se—O distance within the anion, and features at 2.0-2.3 Å consistent with a slight contraction of the average Zr—O distance.

Figure 10:
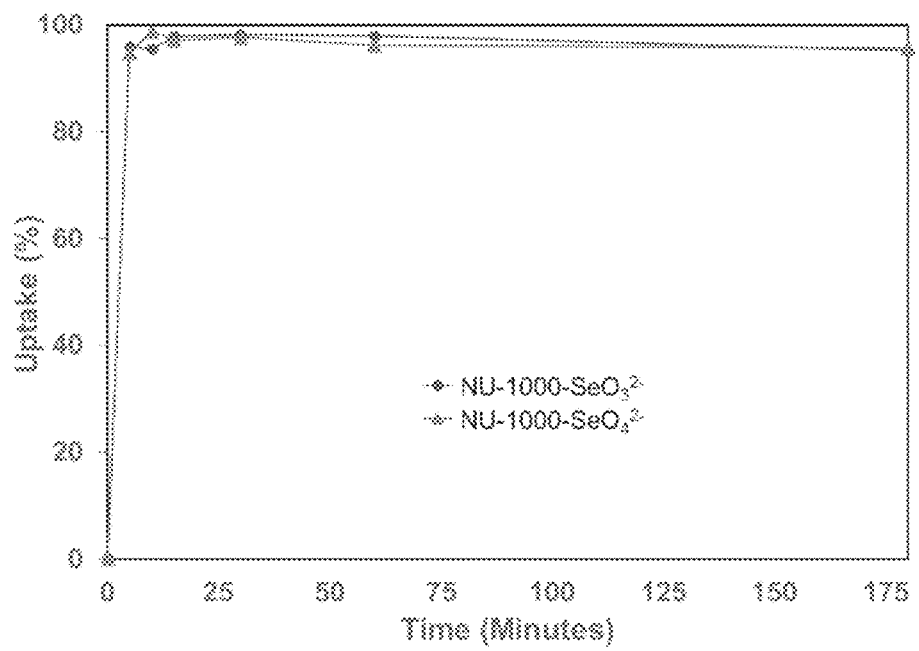
FIG. 10 illustrates selenate and selenite uptake vs. time in NU-1000 (2 mg) at low concentration and a starting concentration of 1000 ppb as Se.

FIG. 10 illustrates selenate and selenite uptake vs. time in NU-1000 (2 mg) at low concentration and a starting concentration of 1000 ppb as Se. To test if current EPA standards for selenium in water can be satisfied by using NU-1000 as a sorbent, uptake of selenate and selenite at low concentrations was also studied. When exposed to 5 mL of an aqueous solution of selenium as sodium selenite or sodium selenate at 1000 ppb, 2 mg of NU-1000 adsorbed 98% of the selenite or selenate in solution in less than 5 minutes. After 3 hours, the amount adsorbed remained constant, meaning that the anions adsorbed after 5 minutes did not subsequently leach from the sorbent. With a remnant solution concentration of only ~20 ppb selenium, test samples treated with NU-1000 meet the EPA standards for drinking water of <50 ppb selenium. It would be expected that those of skill in the art of engineering fluid cleanup equipment and the like would be able to optimize these results so as to contact the NU-1000 MOF with a continuous flow stream of aqueous solutions of selenate and selenite and to produce after suitable contact time an effluent water stream with concentration of these ions on the order of ten part per billion as selenium.

Figure 11:
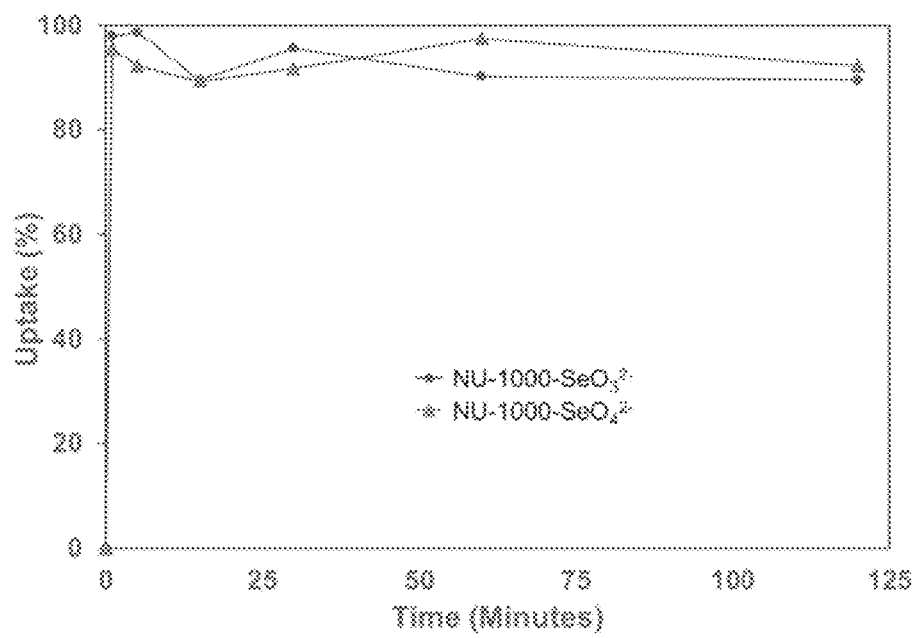
FIG. 11 illustrates selenate and selenite uptake vs. time in NU-1000 (2 mg) at low concentration and 40° C. and a starting concentration of 1000 ppb as Se.
Figure 12:
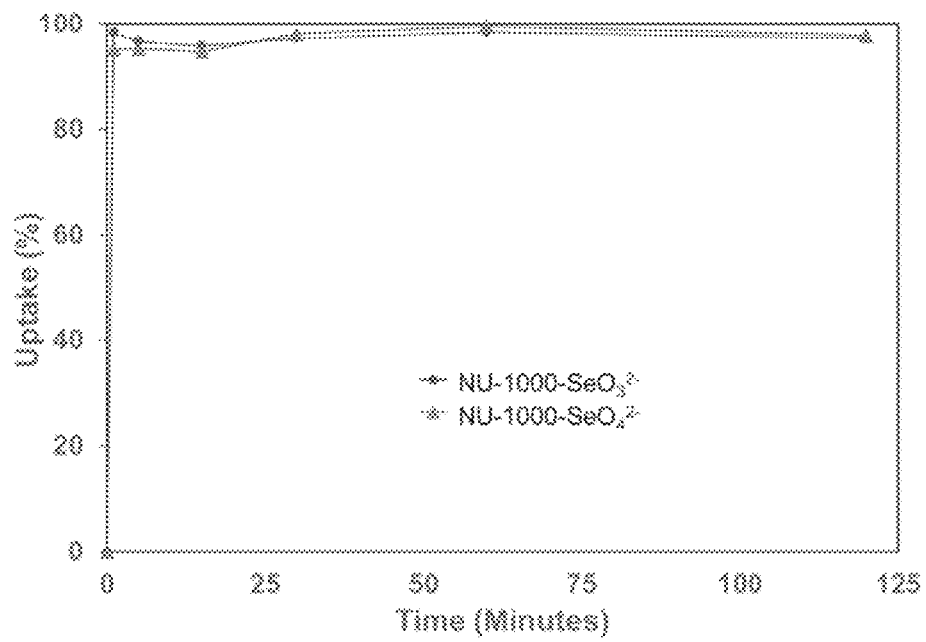
FIG. 12 illustrates the selenate and selenite uptake vs. time in NU-1000 (2 mg) at low concentration and pH 6 and a starting concentration of 1000 ppb as Se.
Figure 13A:
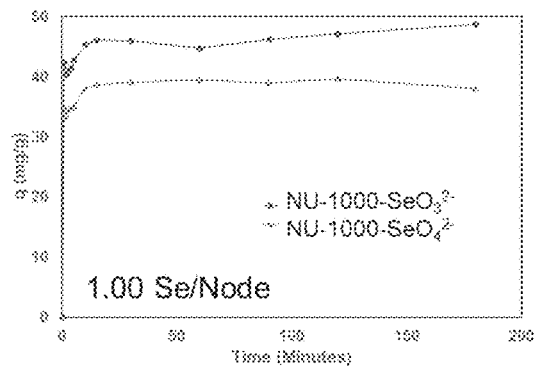
FIGS. 13A-E illustrate the amount adsorbed (q) vs. time at various concentrations of selenate and selenite per node of NU-1000, wherein the amount adsorbed is presented in weight of the full oxy-anion in milligrams normalized by the weight of the bare NU-1000 MOF in grams.
Figure 13B:
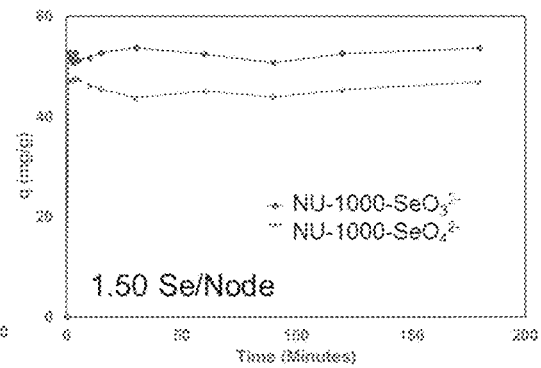
Figure 13C:
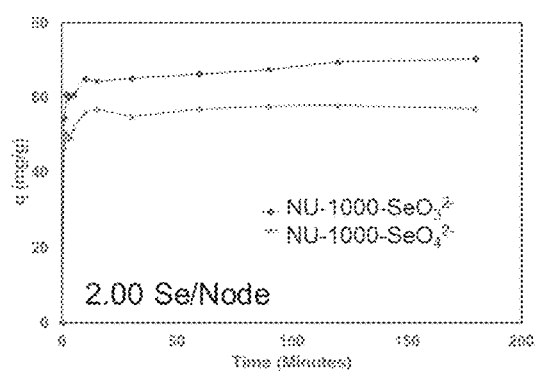
Figure 13D:
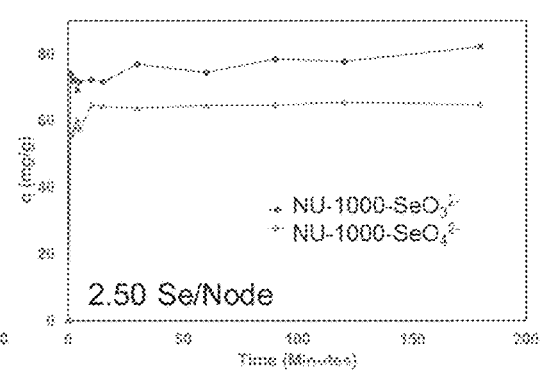
Figure 13E:
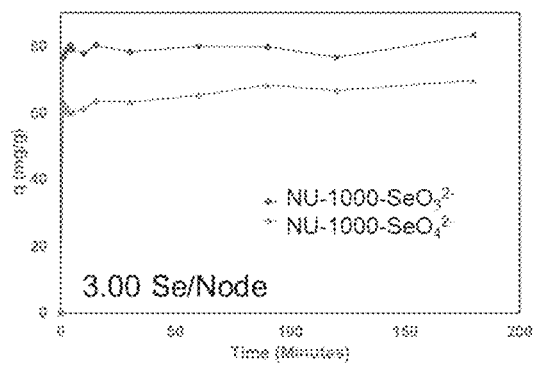

Adsorption of selenate and selenite by NU-1000 at low concentrations was also tested at 40° C. (FIG. 11) and pH 6 (FIG. 12) to simulate the conditions of recirculating cooling water from the flue gas desulfurization process in power plants where selenate and selenite remediation is a concern. FIG. 11 illustrates selenate and selenite uptake vs. time in NU-1000 (2 mg) at low concentration and 40° C. and a starting concentration of 1000 ppb as Se. FIG. 12 illustrates the selenate and selenite uptake vs. time in NU-1000 (2 mg) at low concentration and pH 6 and a starting concentration of 1000 ppb as Se. The successful tests showed that NU-1000 is a promising candidate for removal of selenite or selenate under power plant operating conditions.

FIGS. 13A-E illustrate the amount adsorbed (q) vs. time at various concentrations of selenate and selenite per node of NU-1000, wherein the amount adsorbed is presented in weight of the full oxy-anion in milligrams normalized by the weight of the bare NU-1000 MOF in grams. FIGS. 14A-C illustrate a Langmuir plot (linear, type I) for selenite and selenate adsorption on NU-1000, with adsorbed amount as the weight of the full oxy-anions. The amount of selenite and selenate adsorbed per gram of NU-1000 was probed by exposing the MOF to various concentrations of selenite or selenate and monitoring the amount adsorbed (q) in mg of analyte/g of adsorbent over time (FIGS. 13A-E). Adsorption isotherm data was fit using the Langmuir model and high correlation coefficients were obtained (FIGS. 14A-C). Using the Langmuir equation, the maximum adsorption capacity (Q) of NU-1000 for selenite is 95 mg/g and for selenate is 85 mg/g. These data are roughly comparable to a millimole level of analyte per gram of uptake media. At amounts (i.e., concentrations and volumes) corresponding to 1.00 to 3.00 selenite or selenate anions per node, NU-1000 was found to reach its maximum adsorption within 1 minute of exposure (FIG. 13). The adsorption capacity of NU-1000 places it among the highest-capacity selenate and selenite adsorbing materials described to date; these analyte oxy-anions are much larger in size than the typical sulfate or chloride anion and are harder to achieve overall uptake capacity in many typical adsorption or ion exchange media available commercially. The uptake time of <1 minute in particular sets NU-1000 apart from other materials such as aluminum oxide and iron oxide derivatives as well as ion exchange and polymer resins, each of which require 30 or more minutes to reach maximum adsorption capacity under equivalent conditions. This feature, along with the low equilibrium final Se concentrations seen for NU-1000, is likely a manifestation of the significantly improved binding capability of the MOF for the larger oxy-anions when compared to other available adsorption media.

Adsorption capacity as a function of time at different concentrations (q) is given in FIG. 14 where $q=(C_i-C_f) \times V/m$ and $C_i$=initial concentration of selenate or selenite, $C_f$=final concentration at a given time, V=volume of selenate or selenite solution used and m=mass of NU-1000. For the Langmuir plots shown, the type I linear equation (FIG. 14) was used where $C_e$=equilibrium concentration of selenate or selenite in solution, $q_e$=equilibrium adsorption capacity, Q=maximum adsorption capacity of NU-1000 and $K_L$=Langmuir adsorption constant. $q_e$ and $C_e$ are taken as the average values of q and $C_f$, respectively, from the analysis performed in FIG. 13 and described above.

TABLE S2

Values of $C_e$ and $q_e$ used in FIG. 14 for selenate and selenite adsorption on NU-1000.

| Selenite on NU-1000 | | | Selenate on NU-1000 | | |
|---|---|---|---|---|---|
| Ca. Per Node Exposure | $C_e$ (ppm) | $q_e$ (mg/g) | Ca. Per Node Exposure | $C_e$ (ppm) | $q_e$ (mg/g) |
| 1.00 | 7.0 | 45.9 | 1.00 | 7.0 | 37.1 |
| 1.50 | 12.5 | 52.3 | 1.50 | 9.4 | 46.2 |
| 2.00 | 23.9 | 63.8 | 2.00 | 23.3 | 53.8 |
| 2.50 | 33.9 | 73.9 | 2.50 | 31.3 | 61.6 |
| 3.00 | 41.0 | 83.4 | 3.00 | 39.1 | 69.9 |

Figure 15A:
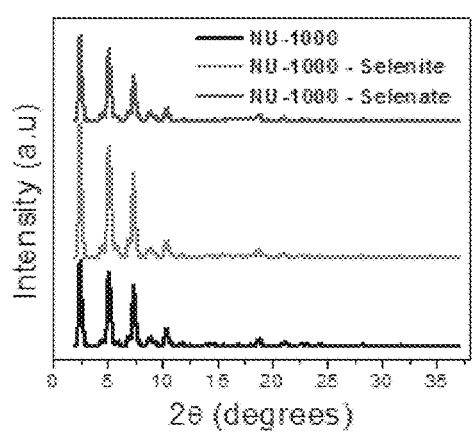
FIG. 15A illustrates a powder X-ray diffraction pattern of as-synthesized NU-1000 compared to NU-1000 after adsorption of selenite or selenate.
Figure 15B:
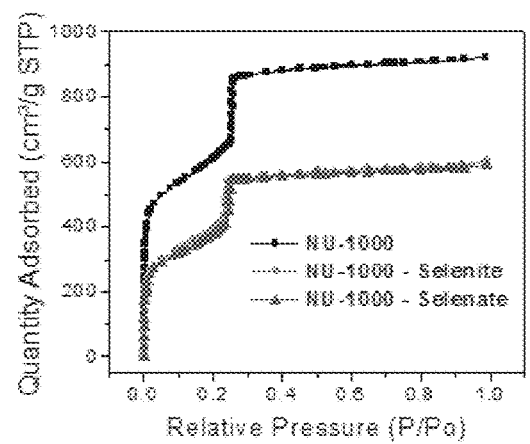
FIG. 15B illustrates a nitrogen adsorption isotherm of as-synthesized NU-1000 compared to NU-1000 after adsorption of selenite or selenate.

FIG. 15A illustrates a powder X-ray diffraction pattern of as-synthesized NU-1000 compared to NU-1000 after adsorption of selenite or selenate. FIG. 15B illustrates a nitrogen adsorption isotherm of as-synthesized NU-1000 compared to NU-1000 after adsorption of selenite or selenate. Characterization of NU-1000 before and after adsorption of selenate and selenite suggests that the framework remains intact. Powder X-ray diffraction patterns are unchanged before and after adsorption. The Brunauer-Emmett-Teller (BET) volumetric surface area of NU-1000 before adsorption is $1035 \pm 5$ m$^2$/cm$^3$ (gravimetric surface area: $2130 \pm 5$ m$^2$/g) whereas after adsorption of selenate and selenite the volumetric surface area drops slightly to $682 \pm 10$ m$^2$/cm$^3$ and $705 \pm 10$ m$^2$/cm$^3$ respectively (gravimetric surface area: $1240 \pm 10$ and $1300 \pm 10$ m$^2$/g) (FIG. 15B). Similarly modest decreases have been reported following Al(III) installation on NU-1000's nodes via atomic layer deposition.

Figure 16A:
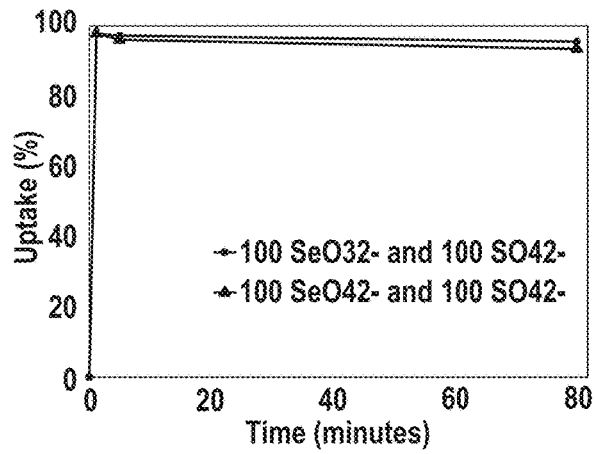
FIGS. 16A-C illustrate selenate and selenite uptake as a function of time using 2 mg of NU-1000 and 10 mL of aqueous solution containing 100 ppb Se and (a) 100 ppb sulfur S and (b) 500 ppb S and (c) 1000 ppb S as sulfate.
Figure 16B:
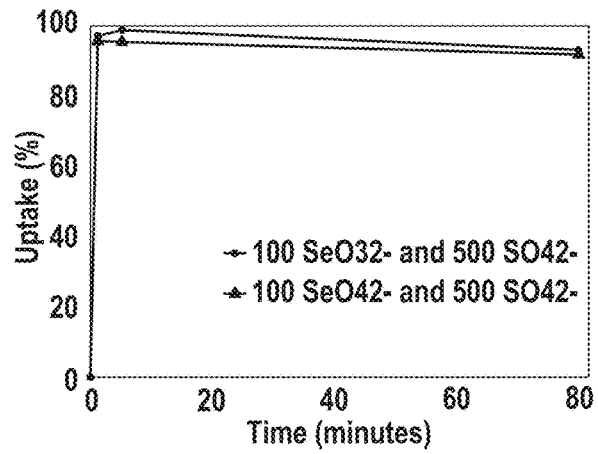
Figure 16C:
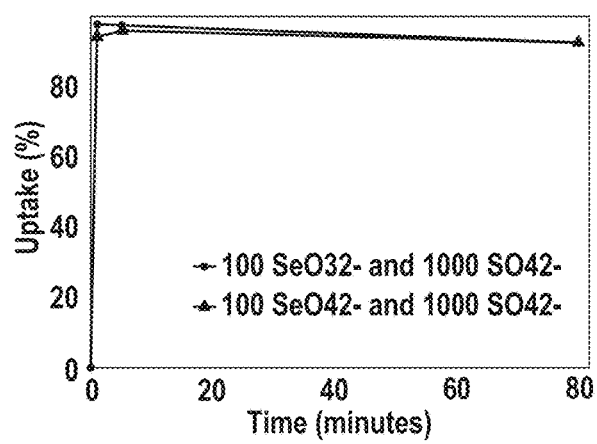

FIGS. 16A-C illustrate selenate and selenite uptake as a function of time using 2 mg of NU-1000 and 10 mL of aqueous solution containing 100 ppb Se and (a) 100 ppb sulfur S and (b) 500 ppb S and (c) 1000 ppb S as sulfate. Specifically, FIGS. 16A-C illustrate the performance of the NU-1000 MOF using nodal uptake of selenate and selenite in the presence of competing sulfate anions.

Batch adsorption studies were performed for selenate and selenite uptake both in the presence of sulfate originally upon exposure to the bare MOF and as a "knock-off study" wherein sulfate was exposed to the MOF already having adsorbed the selenium oxy-anions. The competitive adsorption case was studied by exposing 2 mg of NU-1000 to 10 mL aqueous solutions containing 100 ppb Se as either $SeO_4^{2-}$ or $SeO_3^{2-}$ as well as 100, 500, or 1000 ppb S as $SO_4^{2-}$. In all cases, >95% of the Se in solution is adsorbed (FIGS. 16A-C) and the presence of $SO_4^{2-}$ (up to ten time higher concentration in ppb) has no effect on the $SeO_4^{2-}$ or $SeO_3^{2-}$ uptake at these concentrations. In addition, the remnant Se concentrations as $SeO_3^{2-}$ or $SeO_4^{2-}$ were found to be between 2-7 and 4-9 ppb Se, respectively.

The "knock-off" studies were performed by first exposing 2 mg of NU-1000 to 10 mL aqueous solutions containing 24 ppm Se as $SeO_4^{2-}$ and $SeO_3^{2-}$. This is equivalent to an exposure level of 3.3 Se/node, which was used to insure that NU-1000 was saturated with $SeO_4^{2-}$ and $SeO_3^{2-}$. NU-1000-2$SeO_4^{2-}$ and NU-1000-2$SeO_3^{2-}$ was then exposed to an aqueous solution containing 25 ppm $SO_4^{2-}$ (equivalent to 3 S/node) and the leaching of $SeO_4^{2-}$ and $SeO_3^{2-}$ was probed as a function of time. There was minimal leaching (3%) of $SeO_3^{2-}$ from NU-1000-2$SeO_3^{2-}$ in the presence of $SO_4^{2-}$ whereas leaching of $SeO_4^{2-}$ from NU-1000-2$SeO_4^{2-}$ was more significant (20%) in the presence of $SO_4^{2-}$, but still low compared to many other types of adsorption media for which it is difficult even to obtain adsorption of both speciation of selenium oxy-anion without sulfate much less with a knock-off challenge.

The following describes the general methods used for the above analysis. UiO-66, UiO-66-NH$_2$, UiO-66-(NH$_2$)$_2$, UiO-66-(OH)$_2$ and UiO-67 were made according to procedures described in Katz, M. J.; Brown, Z. J.; Colon, Y. J.; Siu, P. W.; Scheidt, K. A.; Snurr, R. Q.; Hupp, J. T.; Farha, O. K. A facile synthesis of UiO-66, UiO-67 and their derivatives. *Chem. Commun.* 2013, 49, 9449-9451, which is incorporated herein by reference in its entirety. NU-1000 was made according to a procedure described in Planas, N.; Mondloch, J. E.; Tussupbayev, S.; Borycz, J.; Gagliardi, L.; Hupp, J. T.; Farha, O. K.; Cramer, C. J. Defining the Proton Topology of the Zr$_6$-Based Metal-Organic Framework NU-1000. *J. Phys. Chem. Lett.* 2014, 5, 3716-3723, which is incorporated herein by reference in its entirety). Powder X-ray diffraction measurements were obtained using a Bruker MX I μS microsource with Cu-Kα radiation and an Apex II CCD detector. Measurements were made over a range of 2°<2θ<37°. N$_2$ adsorption and desorption isotherm measurements were performed on a Micromeritics Tristar II at 77K. Samples were activated by heating at 120° C. for 12 hours under high vacuum on a Micromeritics Smart VacPrep. All gases used were Ultra High Purity Grade 5 as obtained from Airgas Specialty Gases. DRIFTS were recorded on a Nicolet 6700 FTIR spectrometer equipped with an MCT detector that was cooled to 77 K. The spectra were collected in a KBr mixture under Argon purge (samples prepared in air). Pure KBr was measured as the background and subtracted from sample spectra. ICP-OES data were collected on a Varian Vista MPX ICP Spectrometer. ICP-MS data were collected on a ThermoFisher X Series II instrument equipped with Collision Cell Technology (CCT) to reduce interferences from doublets for accurate detection of Se. ICP standards were purchased from Fluka Analytical. The as-purchased Na and Se ICP standards were 1000 mg/L in 2% nitric acid, TRACECERT and the Zr standard was 10 000 μg/mL in 4 wt % HCl. Standards for ICP-OES measurements (0.25-10 ppm) were prepared via serial dilution in 3% H$_2$SO$_4$ and standards for ICP-MS measurements (4-1000 ppb) were prepared via serial dilution in 3% HNO$_3$. Scattering data for PDF analysis were collected at beamline 11-ID-B at the Advanced Photon Source (APS) at Argonne National Laboratory (ANL). High energy X-rays (58.66 keV, λ=0.2114 Å) were used in combination with a Perkin Elmer amorphous silicon-based area detector. The samples were loaded into Kapton capillaries for PDF measurements under ambient conditions. PDF measurements were collected on NU-1000 samples containing selenate or selenite by taking 60 frames of 2 seconds exposure each. The 2-D scattering images were integrated to obtain 1-D scattering intensity data using software Fit2D. The structure function S(Q) was obtained within software PDFgetX3. Direct Fourier transform of the reduced structure function $F(Q)=Q[S(Q)-1]$ led to the reduced pair distribution function, $G(r)$, with $Q_{max}=23$ $Å^{-1}$. Contributions from the pristine MOF were measured under exactly same conditions and subtracted to yield differential PDF (dPDF). The dPDF data show the new contributions coming from Se-atom correlations. Models for Se coordination modes ($\eta_2\mu_2$ or $\mu_2$) to the MOF Zr-cluster were constructed within CrystalMaker. PDFs for both models were simulated using PDFGui[32] and compared with the experimental ones.

Initial selenite/selenate uptake studies were performed by exposing 10 mg of MOF to 5 mL of an aqueous, 100 ppm solution of selenium as sodium selenite or sodium selenate in a 15 mL polypropylene centrifuge tube. 100 ppm control solutions of sodium selenite and sodium selenate were also prepared. The solutions were centrifuged for 1 minute to allow the MOF to settle to the bottom of the tube. After 72 hours, 0.5 mL of the supernatant was removed and diluted to 10 mL in 3% $H_2SO_4$ for ICP-OES measurements. ICP-OES was used to determine the concentration of Se, Zr, and Na in each solution. Comparison of control solutions to those containing MOF was used to determine the amount of selenate or selenite adsorbed by the MOF.

Kinetic studies were performed by exposing 10 mg of UiO-66-$(NH_2)_2$, UiO-66-$NH_2$ and NU-1000 to 5 mL of an aqueous, 100 ppm solution of selenium as sodium selenite or sodium selenate in a 15 mL polypropylene centrifuge tube. The solutions were centrifuged for 1 minute to allow the MOF to settle to the bottom of the tube. 0.5 mL aliquots of the supernatant were removed at 3, 27, and 72 hours and diluted to 10 mL in 3% $H_2SO_4$ for analysis by ICP-OES. ICP-OES was used to determine the concentration of Se, Zr, and Na in each solution. Comparison of control solutions to those containing MOF was used to determine the amount of selenate or selenite adsorbed by the MOF at each time.

The maximum uptake per node of NU-1000 was determined by exposing 2 mg of NU-1000 to 5 ml of an aqueous solution of sodium selenite or sodium selenate in a 15 ml polypropylene centrifuge tube with selenium concentrations of 30, 45, 60, 75, 90, and 105 ppm. These concentrations correspond to an exposure level of 2-7 analyte molecules per MOF node (i.e., $Zr_6$ cluster). The solutions were centrifuged for 1 minute to allow the MOF to settle to the bottom of the tube. Aliquots of the supernatant were removed and diluted to 10 mL in 3% $H_2SO_4$ for analysis by ICP-OES. ICP-OES was used to determine the concentration of Se, Zr and Na in each solution. Comparison of control solutions to those containing MOF was used to determine the number of selenate or selenite anions adsorbed per node of NU-1000.

Low concentration kinetic studies were performed by exposing six 2 mg samples of NU-1000 to 5 mL of an aqueous, 1 ppm solution of selenium as sodium selenite or sodium selenate in a 15 mL polypropylene centrifuge tube. The solutions were centrifuged for 1 minute to allow the MOF to settle to the bottom of the tube. 2895 µL aliquots of the supernatant were removed from each solution at different times (5, 10, 15, 30, 60, and 180 minutes) and diluted to 3 mL in 3% $HNO_3$ for analysis by ICP-MS. ICP-MS was used to determine the concentration of Se, Zr, and Na in each solution. Comparison of control solutions to those containing MOF was used to determine the amount of selenate or selenite adsorbed by the MOF at each time. Studies at 40° C. and pH 6 were performed in the same fashion. To perform tests at 40° C., the selenate and selenite solutions were heated in a beaker full of Lab ARMOR BEADS and to perform tests at pH 6 the selenate and selenite solutions were made in pH 6 HCl.

The amount of selenate or selenite adsorbed per gram of NU-1000 was determined by exposing 5 mg of NU-1000 to 10 mL of an aqueous solution of selenium as sodium selenite or sodium selenate in a 15 mL polypropylene centrifuge tube with concentrations of ca. 18, 27, 36, 45, and 55 ppm. These concentrations correspond to an exposure level of 1.00, 1.50, 2.00, 2.50 and 3.00 analyte molecules per $Zr_6$-node of NU-1000. The solutions were centrifuged for 30 seconds to allow the MOF to settle to the bottom of the tube. Aliquots of the supernatant were removed and diluted to 10 mL in 3% $H_2SO_4$ at 1, 2, 3, 4, 5, 10, 15, 30, 60, 90, 120, and 180 minutes for analysis by ICP-OES. ICP-OES was used to determine the concentration of Se, Zr, and Na in each solution. Comparison of control solutions to those containing MOF was used to determine the amount of selenate or selenite adsorbed (q) in mg/g of NU-1000 where q=(Ci−Cf)×V/m, Ci=initial concentration, Cf=final concentration, V=volume of solution exposed to NU-1000 and m=mass of NU-1000 in g.

As noted above, Zr-based MOFs, including, for example, NU-1000, may remove other oxy-anions, such as oxy-anions of aluminum (that is, water soluble aluminum oxides/hydroxides), silicon (that is, silicates and hydrosilicates), phosphorus (such as phosphates and hydrophosphates), sulfur (that is, sulfates), chlorine (such as chlorates and perchlorates), geranium (that is, water soluble oxides/hydroxides of geranium), arsenic (such as, arsenates), tin (that is, stannates), antimony (such as antimonates and antimonites), iodine (such as iodates, per-iodates and iodites), and lead (that is, water soluble oxides/hydroxides of lead).

In some embodiments, the Zr-based MOF, including NU-1000, is used to adsorb oxy-anions of antimony, including oxy-anions in either the Sb[III] (antimonite) or the Sb[V] (antimonate) redox state. Antimony is used in pressurized water reactors as a neutron source (paired with beryllium), and thus, antimony is a constituent in the wastewater generated from nuclear power plants. Antimony is also released from the fuel oxide layer into primary coolant water during the shutdown of nuclear power plants resulting in major radiation doses to personnel and the surrounding environment. Common forms of antimony that are present in aqueous solutions under oxidizing conditions include $Sb(OH)_6^-$, $HSbO_2$, $Sb(OH)_3$, and $Sb(OH)^{4+}$. Therefore, the Zr-based MOF, including NU-1000, can be used to remove oxy-anions of antimony, including those listed above, from these sources.

NU-1000 was exposed to concentrations of $Sb(OH)_6^-$ corresponding to 2-7 Sb/node. Aliquots were taken from the supernatant at 24 hours and 48 hours. Table S3 shows the amount of $Sb(OH)_6^-$ adsorbed by NU-1000 per node. Antimony adsorption in NU-1000 per node after 24 hours and 48 hours using $Sb(OH)_6^-$ as an antimony source.

TABLE S3

Antimony adsorption in NU-1000 per node after 24 hours and 48 hours using $Sb(OH)6^-$ as an antimony source.

| Per node Sb Exposure | Per node uptake 24 hours | Per node uptake 48 hours |
|---|---|---|
| 2 | 1.36 | 1.45 |
| 3 | 1.76 | 1.99 |
| 4 | 1.88 | 2.06 |
| 5 | 1.87 | 2.07 |
| 6 | 2.21 | 2.33 |
| 7 | 1.94 | 2.00 |

Figure 17A:
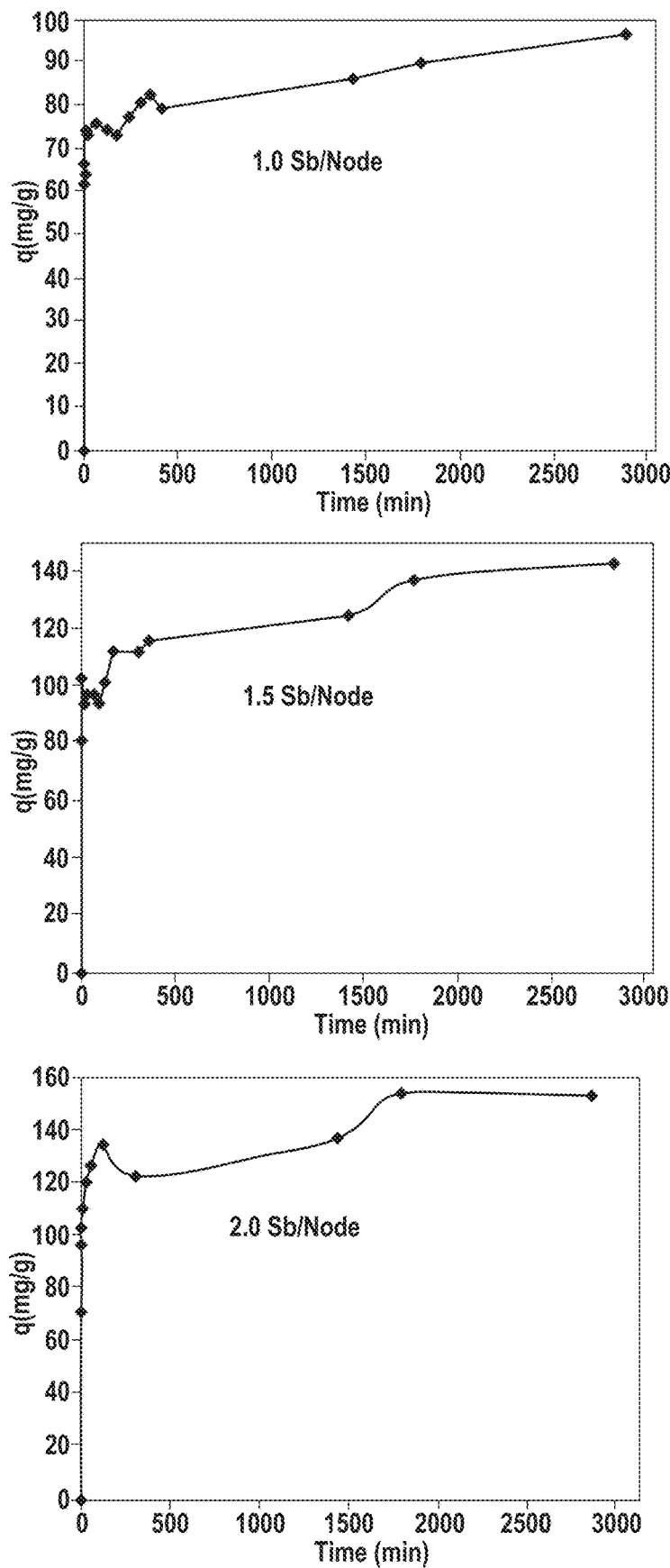
FIGS. 17A-B illustrate the uptake of $Sb(OH)_6^-$ over time in terms of uptake per node.
Figure 17B:
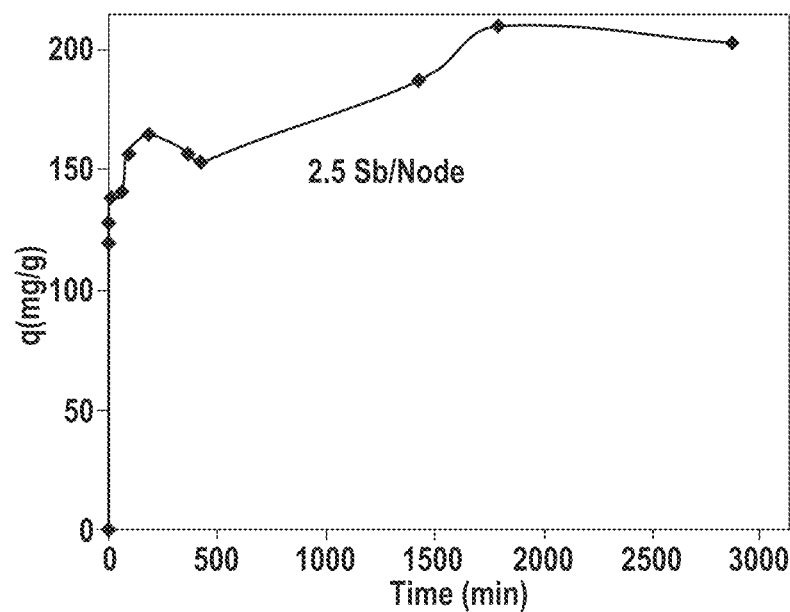
Figure 17B:
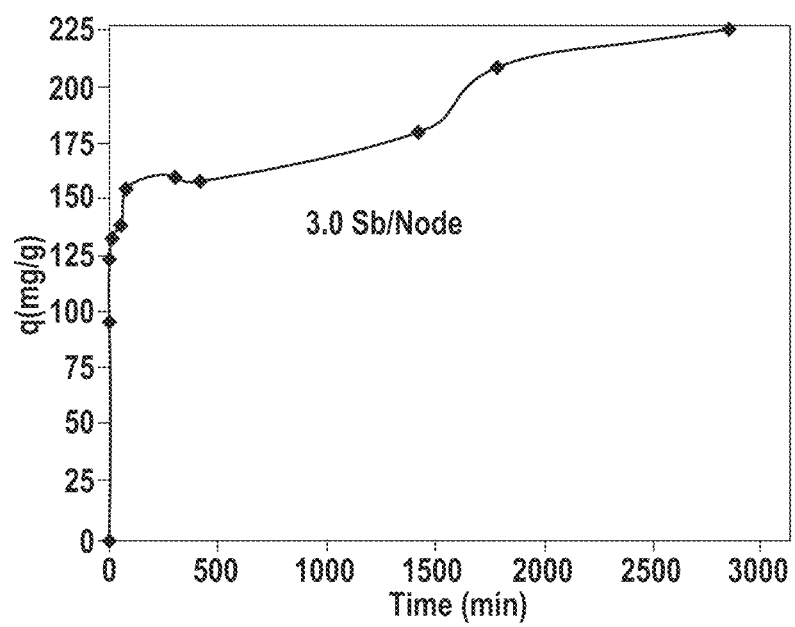
Figure 18:
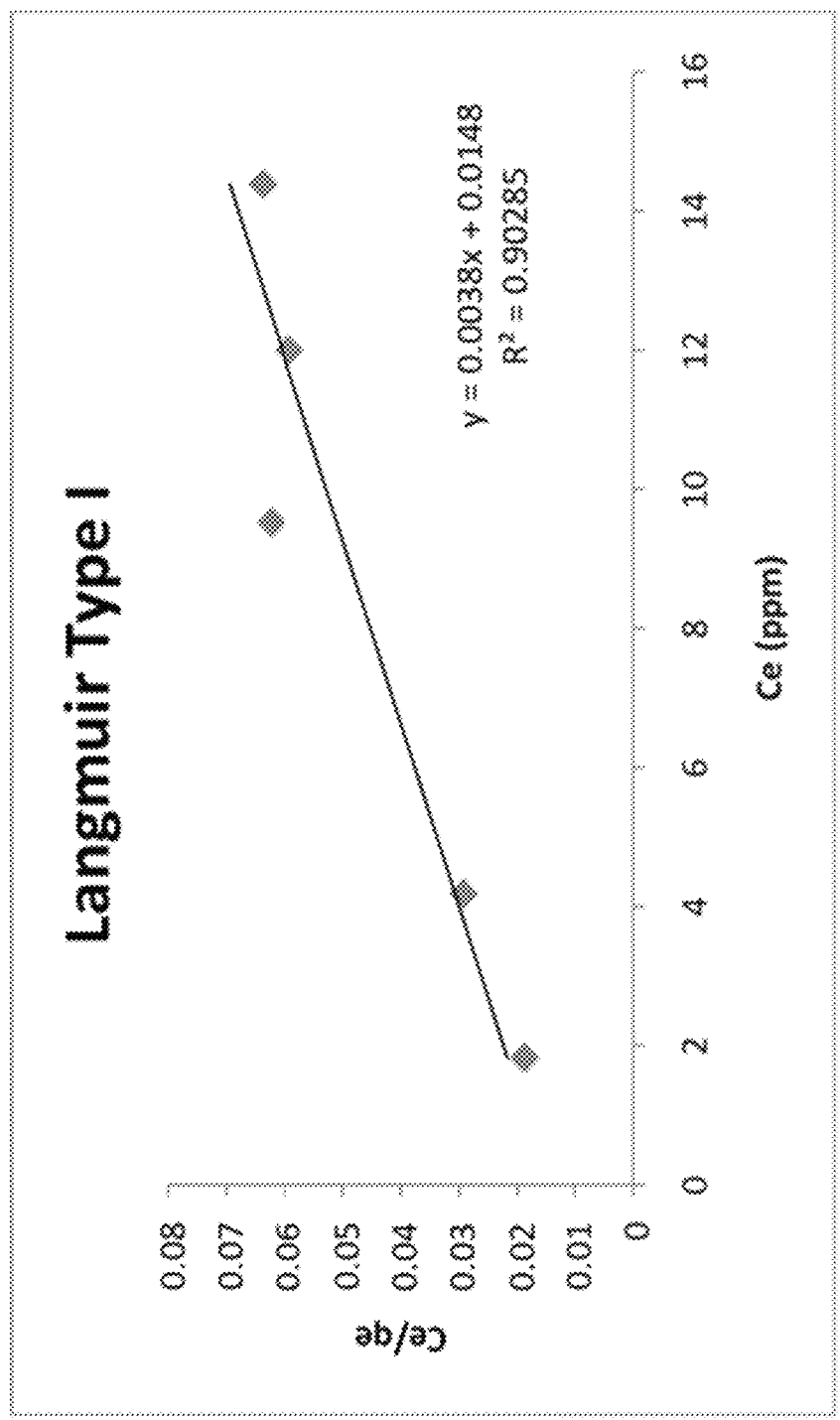
FIG. 18 illustrates a Langmuir fitting from the Sb[V] adsorption isotherms of FIG. 17.

FIGS. 17A-B illustrate the uptake of $Sb(OH)_6^-$ over time in terms of uptake per node. Tests were performed to determine $Sb(OH)_6^-$ uptake over time at $Sb(OH)_6^-$ concentrations corresponding to 1.00, 1.50, 2.00, 2.50 and 3.00 $Sb/Zr_6$ node. Aliquots from each solution were taken at 1, 5, 10, 15, 30, 60, 90, 120, 180, 240, 300, 360, 420, 1440, 1800, and 2880 minutes. These show that the adsorption kinetics for $Sb(OH)_6^-$ in NU-1000 are fast with more than 60% of the total capacity reached in less than 1 minute. FIG. 18 illustrates a Langmuir fitting from the Sb adsorption isotherms of FIGS. 17A-B. FIG. 18 illustrates a maximum adsorption capacity for $Sb(OH)_6^-$ in NU-1000 of 260 mg/g (or 142 mg/g Sb only).

Figure 19:
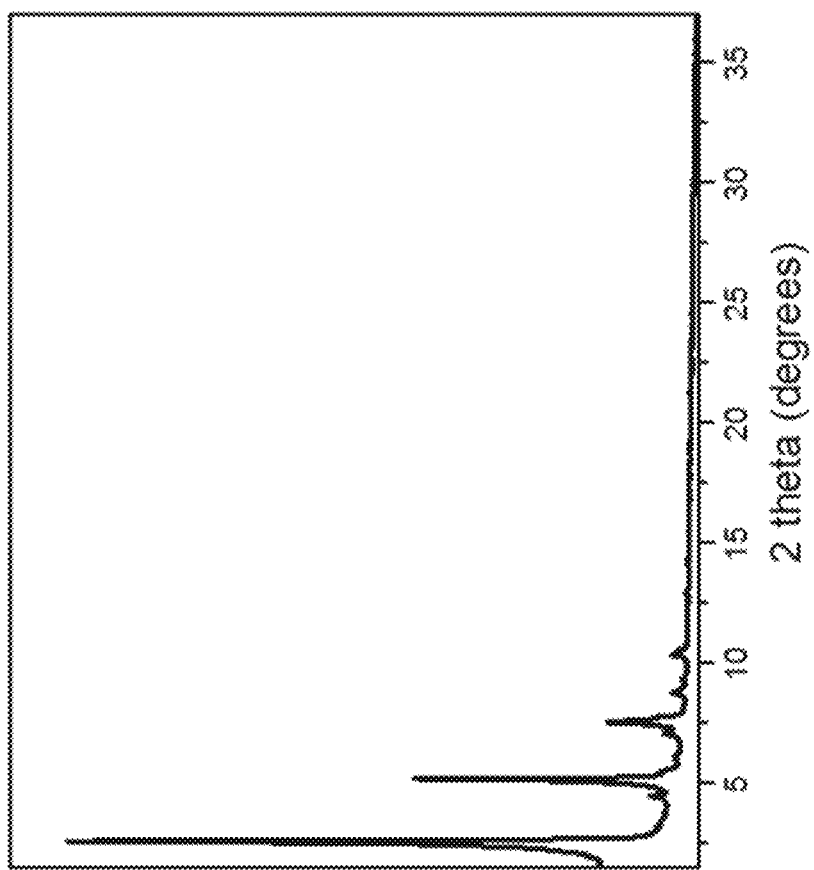
FIG. 19 illustrates the powder x-ray diffraction pattern for NU-1000 and NU-1000 with $Sb(OH)_6^-$.
Figure 20:
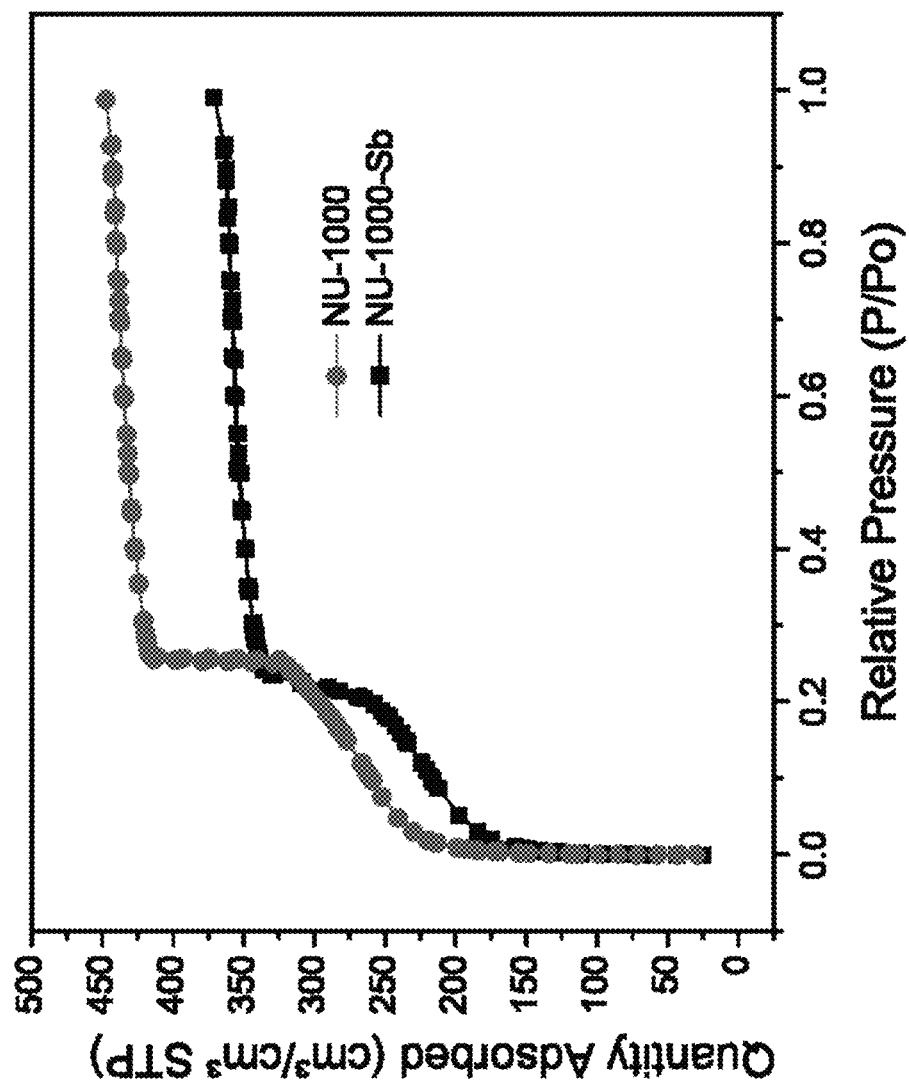
FIG. 20 illustrates the nitrogen isotherm for NU-1000 and NU-1000 with $Sb(OH)_6^-$.

FIG. 19 illustrates the powder x-ray diffraction pattern for NU-1000 and NU-1000 with $Sb(OH)_6^-$. This shows the stability of NU-1000 after adsorption of $Sb(OH)_6^-$. PXRD, nitrogen adsorption-desorption isotherms, and ICP-OES measurements were taken to determine bulk crystallinity, porosity, and Zr leaching, respectively. The PXRD patterns show that the bulk crystallinity of NU-1000 remains intact after adsorption. FIG. 20 illustrates the nitrogen isotherm for NU-1000 and NU-1000 with $Sb(OH)_6^-$. This shows that the surface area of the material decreases to approximately what would be expected given that mass is being added to the framework. Lastly, no Zr leaching from the framework is observed by ICP-OES.

Similar to the adsorption of oxy-anions of selenium, adsorption of oxy-anions of lead would be expected using a Zr-based MOF, including NU-1000. Lead in caustic solution in which its oxy-anion forms as previously identified above is believed to be involved in intergranular attack/stress corrosion cracking of steam generator tubes in nuclear power plants. Therefore, removal of these oxy-anions, including oxy-anions in either the Pb[II] or the Pb[IV] redox state, such as $Pb(OH)_6^{2-}$, $Pb(OH)_6^{4-}$, $PbO_3^{2-}$, and $PbO_2^{2-}$, from the related liquid streams would be beneficial.

It should be appreciated that in some embodiments, the MOFs of the present invention provide for the adsorption of the oxy-anions even in the present of other species that may compete for adsorption sites on the MOF. In particular, in some liquid streams, such as those in flue gas desulfurization systems, oxy-anions of boron and sulfur in the liquid phase may compete for adsorption sites on the MOF. However, even in the presence of these species, it has been found that the MOFs of the present invention still provided for the adsorption of oxy-anions. One of skill in the art will appreciate that the concentration of the various species, including the oxy-anion to be adsorbed and any competing species, should be taken into account in determining the concentration of the MOF to be used in the liquid stream of interest.

Tables S4, S5, and S6 show test results for the use of NU-1000 in a flue gas desulfurization liquid stream sample, both before and after the addition of the NU-1000. (With respect to Table S4, it should be recognized that Stage 1 FGD wastewater can contain many more particulate form selenates/selenites than soluble oxy-anions, which may account for the relatively small adsorption amounts after exposure to the MOF.)

TABLE S4

FGD wastewater (10 mL) before and after treatment with NU-1000 (10 mg).

| Sample Name | Boron (ppm) | Selenium (ppm) | Sulfur (ppm) |
|---|---|---|---|
| Stage 1-FGD (before) | 75.2 | 0.252 | 386.8 |
| With NU-1000 (after) | 75.1 | 0.209 | 386.6 |

TABLE S5

FGD wastewater (10 mL) before and after treatment with NU-1000 (10 mg).

| Sample name | Selenium | Sulfur | Boron | Sodium |
|---|---|---|---|---|
| Stage 3-FGD (before) | 19.6 ppb | 865.3 ppm | 19.5 ppm | 147.0 ppm |
| With NU-1000 (after) | 2.3 ppb | 788.0 ppm | 18.4 ppm | 146.8 ppm |

TABLE S6

Uptake of Se from FGD wastewater with various amounts of NU-1000.

| Sample Name | 2 min | 10 min | 20 min | 1 hr |
|---|---|---|---|---|
| Stage 3-FGD (before) | 21.78 ppb | 21.78 ppb | 21.78 ppb | 21.78 ppb |
| After 10 mg NU-1000 | 14.68 ppb | 10.52 ppb | 10.33 ppb | 10.20 ppb |
| After 25 mg NU-1000 | 10.35 ppb | 6.33 ppb | 6.25 ppb | 6.10 ppb |
| After 50 mg NU-1000 | 5.59 ppb | 4.51 ppb | 4.29 ppb | 3.97 ppb |

With respect to Tables S4 and S5, 10 mg of NU-1000 was added to 10 mL of wastewater, which is equivalent to exposure levels of $15B/Zr_6$ node, $26S/Zr_6$ node and only $0.007Se/Zr_6$ node, which are very challenging competitive conditions. Table S4 shows the levels of B, Se and S in the wastewater after treatment with NU-1000, and only 100 ppb B, 43 ppb Se, and 160 ppb of S were taken up by the MOF. Given that exposure levels of B and S are 2100× and 3700× that of Se, the NU-1000 is still able to adsorb Se. Accordingly, in some embodiments, adsorption of selenium oxy-anions still occurs in the presence of ions present at a range of 100-10,000× the selenium oxy-anion concentration.

With respect to Table S6, different amounts of NU-1000 (50 mg, 25 mg, 10 mg, 5 mg) were tested for the removal of $SeOx^{2-}$ from stage 3 FGD water and data points were taken at shorter times (5 min, 10 min, 30 min). This shows the minimum amount of MOF and the shortest time possible to obtain the desired results. As apparent from Table S6, as the amount of MOF increases and the time of exposure increases, the effluent concentration of the oxyanion remaining in the plant water sample decreases. MOF exposure time and MOF loading improvements appear to be equivalent in their ability to improve oxyanion uptake.

The Zr-based MOFs of the present invention may range in crystalline size and still provide for the adsorption of the oxy-anions noted above. In some embodiments, the crystalline size of NU-1000 may range from approximately 75-5000 nm. In some embodiments, the crystalline size of NU-1000 may range from approximately 75-1200 nm or from approximately 300-5000 nm. In some embodiments, the NU-1000 may range from 75-1200 nm. In some embodiments, the MOFs of the present invention may have relatively large apertures, for example, up to approximately 30 Å or larger, which promotes diffusion of the analytes and improves the uptake kinetics. It should be appreciated that a larger aperture MOF will allow diffusive access of the oxy-anion to the available nodes for uptake more readily than smaller geometries.

Based on the foregoing, the present invention provides for taking the above MOFs and their ability to remove anionic species and attaching a plurality of ligands to the MOF structure to also complex certain cationic species in addition to removing anionic species. Following is a description of the ligands to be attached to the MOF for purposes of complexing a given cation species, followed by a description of its synthesis to a pendant group, such as a pendant benzyl group. Following this is a further description of its synthesis and attachment to a pendant group, such as a pendant benzyl group, on a MOF of the present invention, for example, via the linker portion of the MOF, to provide a ligated MOF according to the present invention for removal of both anionic and cationic species from a liquid or liquid stream.

Figure 21:
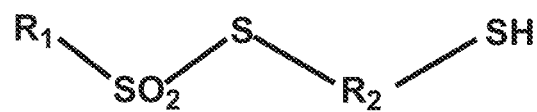
FIG. 21 illustrates a generic chemical compound for use in removing a cation from a liquid according to one embodiment of the invention.

FIG. 21 illustrates a generic chemical compound for use in removing a cation from a liquid according to one embodiment of the invention. As shown, the chemical compound has the formula of $R_1$—$SO_2$—S—$R_2$—SH, where $R_1$ is generally a support molecule having an appropriate pendant group to which the ligand (—$SO_2$—S—$R_2$—SH, where $R_2$ is an alkyl group) can be attached. The ligand is a thiosulfonyl-thiol (—$SO_2$—S—$R_2$—SH) ligand, also known as a thio-alkyl-sulfonyl-mercaptan ligand, where $R_2$ is an alkyl group, which in some embodiments is either propyl or ethyl. In one embodiment, the support molecule $R_1$ may be a MOF of the present invention having an appropriate pendant group to which the ligand can be attached. In some embodiments, a benzyl group can be used as the point at which the sulfonyl group of the ligand is attached. In other words, the MOF may have available pendant benzyl groups to which the ligand is attached through the sulfonyl (i.e., —$SO_2$—) functionality of the ligand. It should be appreciated that the support molecule, such as the MOF, should be able to withstand the conditions used for synthesizing/attaching the ligand of the present invention to the available pendant groups.

It should be appreciated that in some embodiments the sulfonyl group attached to the MOF is such that the thioalkyl group may be attached to the sulfonyl group on the MOF through nucleophilic attack. Therefore, a support molecule, such as a MOF of the present invention, with any pendant group to which the sulfonyl group is attached, and that itself can be attacked nucleophilically, may be used to support the ligand of the present invention. In addition, the resulting structure of the support molecule, such as a MOF of the present invention, with the attached ligand should be stable enough to maintain the capability of backbiting geometry for complexing large divalent cations such as lead ($Pb^{2+}$).

Figure 22:
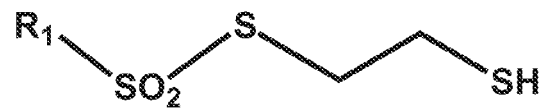
FIG. 22 illustrates one chemical compound for use in removing a cation from a liquid according to one embodiment of the invention.

FIG. 22 illustrates one chemical compound for use in removing a cation from a liquid according to one embodiment of the invention. As shown, in this embodiment, the compound has the structure of the compound of FIG. 1, wherein the alkyl group ($R_2$) is ethyl.

Figure 23:
FIG. 23 illustrates another chemical compound for use in removing a cation from a liquid according to another embodiment of the invention.

FIG. 23 illustrates another chemical compound for use in removing a cation from a liquid according to another embodiment of the invention. As shown, in this embodiment, the compound has the structure of the compound of FIG. 1, wherein the alkyl group ($R_2$) is propyl.

The chemical compounds of the present invention may be synthesized by starting with a support molecule, such as a MOF of the present invention. In order to attach the thiosulfonyl-thiol (—$SO_2$—S—$R_2$—SH) ligand, also known as a thio-alkyl-sulfonyl-mercaptan ligand, onto the inner surface or aperture of the NU-1000 MOF cavity, an appropriate pendant group, such as a pendant benzyl group, to which the ligand can be attached must be added to the structure of the MOF. Such ligand exchanges or insertions are already known to occur via MOF chemistries known as SALE or SALI. Once the pendant group, such as a pendant benzyl group, is attached, it will be essentially dangling from the MOF surface structure, for example, within the MOF cavity from the inner MOF surface structures or near or at the aperture of the MOF cavity.

The sulfonic acid moiety can then be synthesized onto the MOF via this pendant group. As noted, in one embodiment, this pendant group may be a pendant benzyl group. Accordingly, the following synthesis will be described using a pendant benzyl group as the pendant group. The sulfonic acid moiety can then be synthesized onto the MOF via this pendant benzyl group by reacting with thionyl chloride to form a sulfonyl chloride or by reacting with excess chlorosulfonic acid. It should be appreciated that in some cases, using both thionyl chloride and chlorosulfonic acid during addition of the sulfonic acid moiety may result in the addition of inorganic chloride to the aromatic benzene ring. In some embodiments, thionyl chloride can be used in a post-synthesis or subsequent cold wash. It should also be appreciated that storage of the chlorosulfonated MOF, such as in the form of beads, may result in hydrolysis of the sulfonyl chloride groups to sulfonic acid groups. However, subsequent treatment with thionyl chloride can convert sulfonic acid to sulfonyl chloride to provide full chlorosulfonation of each pendant benzyl ring.

Once the sulfonyl chloride has been generated, a ligand precursor terminated on both ends with a mercaptan can be reacted with the polymer sulfonyl chloride in an appropriate basic buffer system. One end of the ligand precursor attaches to the sulfonic acid function of the polymer through a thio-sulfonyl bond. In this way, the ligand can be attached to each identifiable sulfonyl group on the MOF through a thionyl chloride intermediate chemistry in a moderate base to produce the overall compound structure of $R_1$—$SO_2$—S—$R_2$—SH, where $R_1$ is a MOF of the present invention having a pendant benzyl group to which the ligand (—$SO_2$—S—$R_2$—SH) is attached and where $R_2$ is an alkyl group that may be either propyl or ethyl. It is important that the basic feature of the buffer does not attack the thionyl chloride independently of the thio-mercaptan. In some embodiments, the basic solution in which the ligand precursor is attached to the sulfonic acid moiety of the MOF contains sodium hydroxide and may have a pH of approximately 10-11.

To form the chemical compound wherein the alkyl group ($R_2$) is ethyl (see FIG. 22), in one embodiment, the sulfonyl chloride on the MOF may be reacted with 1,2-dimercaptoethane as follows:

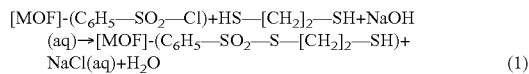

(1)

Specifically, a homogeneous solution of 1,2-dimercaptoethane, sodium hydroxide, and dimethoxyethane (monoglyme, an ether-like solvent) is made. The reaction pH should be approximately 10-11. The reaction must be sufficiently basic such that the 1,2-dimercaptoethane can exist as an anion to condense with the sulfonyl chloride group on the MOF. If the base is too strong, sulfonyl chloride hydrolysis may occur preventing the reaction with the 1,2-dimercaptoethane. If the base is too weak, such may also prevent the reaction with the 1,2-dimercaptoethane.

The MOF with the sulfonyl chloride, such as [MOF]-($C_6H_5$—$SO_2$—Cl), can then be added to the above homogeneous solution. The MOF with the sulfonyl chloride can be added slowly added drop-wise into the solvated dimercaptoalkane solution while the reaction vessel containing the solution is held on ice, as the reaction is exothermic. In some embodiments, the temperature may be maintained at approximately 0-4° C. Various washings may then be used, such as washing with water, methanol, and ethyl acetate. Thereafter, the ligated MOF may be dried and is then ready for use.

To form the chemical compound wherein the alkyl group ($R_2$) is propyl (see FIG. 23), in one embodiment, the sulfonyl chloride on the MOF may be reacted with 1,3-dimercaptopropane as follows:

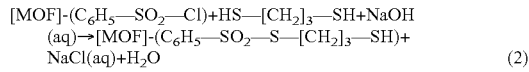

(2)

Specifically, a homogeneous solution of 1,3-dimercaptopropane, sodium hydroxide, and dimethoxyethane (monoglyme, an ether-like solvent) is made. The reaction pH should be approximately 10-11. The reaction must be sufficiently basic such that the 1,3-dimercaptopropane can exist as an anion to condense with the sulfonyl chloride group on the MOF. If the base is too strong, sulfonyl chloride hydrolysis may occur preventing the reaction with the 1,3-dimercaptopropane. If the base is too weak, such may also prevent the reaction with the 1,3-dimercaptopropane.

The MOF with the sulfonyl chloride, such as [MOF]-($C_6H_5$—$SO_2$–Cl), is then added to the above homogeneous solution. The MOF with the sulfonyl chloride can be added slowly added drop-wise into the solvated dimercaptoalkane solution while the reaction vessel containing the solution is held on ice, as the reaction is exothermic. In some embodiments, the temperature is maintained at approximately 0-4° C. Various washings may then be used, such as washing with water, methanol, and ethyl acetate. Thereafter, the ligated MOF may be dried and is then ready for use.

In use and according to one embodiment of the present invention, the MOF of the present invention with the attached ligand for complexing a given cation species can be used to selectively remove particular species from a liquid stream. In use, the chemical compounds of the present invention, specifically the MOF of the present invention with the attached ligand, may be in the form of a medium that is contacted with a given liquid or liquid stream containing an oxy-anion, such as selenite ($SeO_3^{2-}$) and selenate ($SeO_4^{2-}$), oxy-anions of antimony including oxy-anions in either the Sb[III] (antimonite) or the Sb[V] (antimonate) redox state, and oxy-anions of lead including oxy-anions in either the Pb[II] or the Pb[IV] redox state such as Pb$(OH)_6^{2-}$, Pb$(OH)_6^{4-}$, $PbO_3^2$, and $PbO_2^{2-}$, and a cation to be removed, such as a large cation, including, for example, lead ($Pb^{2+}$) or mercury ($Hg^{2+}$). For example, in some embodiments, the medium may be in the form or a resin or resin beads. Other physical forms of the medium known in the art could be used in conjunction with known means of contacting a liquid and such medium for removal of a given species.

The particular MOF with the attached ligand can then be attached to or held by any structure that is used to facilitate contact between the liquid stream having the particular species to be removed and the MOF with the attached ligand, such as pre-coatable filter/demineralizers or independent packed columns, including such devices already in use at a given facility or plant (e.g., existing vessels used for ion exchange). Thereafter, the structure can be appropriately mounted to allow contact between the liquid stream and the MOF with the attached ligand on the structure. Once in contact with the liquid stream, the particular species to be removed, including oxy-anions and particular cations, are complexed by the MOF and the ligand attached to the MOF, respectively, thereby reducing the concentration of that species in the liquid stream.

During contact between the MOFs of the present invention having the ligand attached to the MOF for complexing cations and the liquid containing one or more oxy-anions and cations to be removed, the oxy-anion is complexed or adsorbed by the MOF structure itself via nodal uptake, and the cation upon entering the cavity of the MOF would complexed or ionically interact with the ligand attached to the MOF. As described above, the oxy-anion can be adsorbed by attachment to the zirconium node of the MOF.

The cation is complexed through a bis-sulfur interaction with the ligand in which the cation complexes or ionically interacts with the thio sulfonyl moiety, specifically the mercapto-sulfur of the thio-sulfonyl moiety, and the terminal mercaptan moiety (—SH), which essentially backbites the cation to form five or six member open rings or ring-like geometries, depending upon whether the $R_2$ alkyl group is ethyl or propyl, that essentially incorporate the cation as part of the open ring. In this manner the cation is actually complexed from two points on a single ligand by using the two sulfurs that each contribute electronegativity to the positively charged cation. This ionic interaction provides a more stable complex and reduces the ability of the complexed cation to be released back into solution based upon equilibrium leakage.

Specifically with respect to the complexation of cations, in one embodiment, the cation that is complexed is lead ($Pb^{2+}$). Accordingly, the ligands of the present invention can be used to complex to cationic lead ($Pb^{2+}$) in the liquid phase to remove the cationic lead from the liquid. The sulfhydril attractor is used as the portion of the ligand which takes up lead cations (otherwise known as a terminal mercaptan of the chemical form —SH). The highest binding energy and fastest uptake kinetics have been observed for lead cations when two reduced sulfur moieties are bound to the same lead cation. Moreover, the use of two mercaptans reduces or minimizes the release of bound lead back into solution thereby limiting the effluent removal fraction for a given liquid stream substantially. Accordingly, rather than using two independent mercapto-terminated ligand features to bind to a lead cation, a type of bis-sulfhydril bonding is used, wherein a geometric backbiting, resulting in a five member open ring or ring-like geometry when the ligand has an ethyl alkyl group ($R_2$) or a six member open ring or ring-like geometry when the ligand has a propyl alkyl group ($R_2$). This allows the same ligand to provide both sulfur atoms from which electronegativity is donated to the cationic lead. In some embodiments, the removal of cationic lead exceeds the removal that would otherwise be achieved with ion exchange. It should be appreciated that this same type of bis-sulfhydril bonding can be used to complex mercury cations ($Hg^{2+}$). Accordingly, it should be appreciated that other similar cations may be similarly complexed and removed from a given liquid or liquid stream in conjunction with the removal of oxy-anions.

Figure 24:
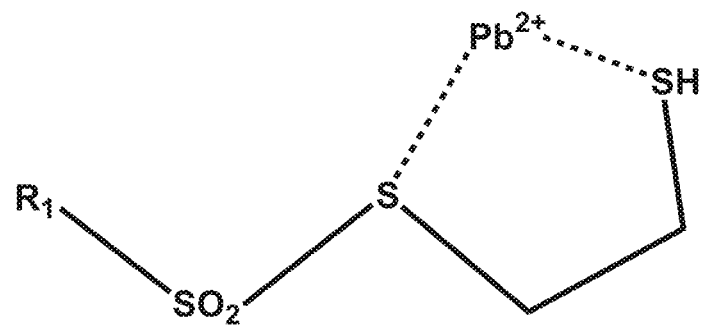
FIG. 24 illustrates the chemical compound of FIG. 22 interacting with cationic lead cation according to one embodiment of the invention.

FIG. 24 illustrates the chemical compound of FIG. 22 interacting with cationic lead cation according to one embodiment of the invention. In this embodiment, the chemical compound of FIG. 22 is shown, which is $R_1$—$SO_2$—S—$R_2$—SH, where $R_1$ is a MOF of the present invention containing appropriate pendant groups, such as a pendant benzyl groups, to which the ligand (—$SO_2$—S—$R_2$—SH) is attached, where $R_2$ is ethyl, and where the dashed lines represent the ionic interactions with the lead. (It should be appreciated that FIG. 24 is not intended to illustrate any steric or otherwise proportional/three dimensional aspects of the chemical compound and the binding of the lead.)

As shown, lead is electronegatively complexed to the ligand through two linkages, one with the mercapto-sulfur of the thio-sulfonyl moiety (or the sulfhydril moiety adjacent to the sulfonyl (also termed a thio-sulfonyl bond) that is attached to the polymer) and the terminal mercapto group at the terminal end of the ligand. In other words, the alkyl, in this case the ethyl alkyl, separates the two points to which the lead is complexed along the ligand. Accordingly, the lead once associated with the ligand in this manner, basically forms a geometry like that of a five member open ring consisting of the ligand backbiting onto the cation. Such adsorptive interactions secure the lead cation to the ligand attached to the MOF and thereby removes the lead cation from the liquid phase or liquid stream.

Figure 25:
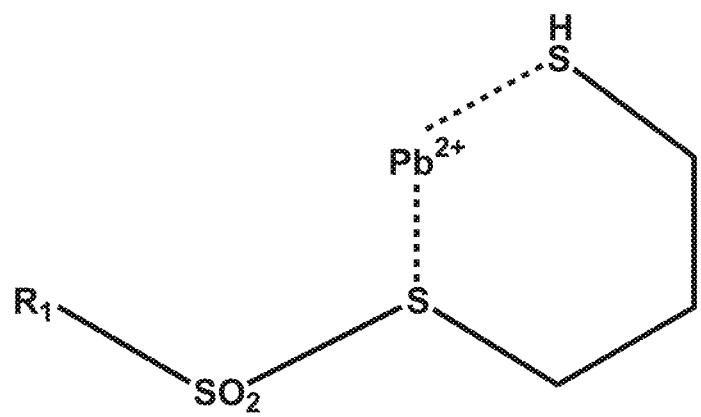
FIG. 25 illustrates the chemical compound of FIG. 23 interacting with cationic lead cation according to one embodiment of the invention.

FIG. 25 illustrates the chemical compound of FIG. 23 interacting with cationic lead according to one embodiment of the invention. The chemical compound of FIG. 23 is shown, which is $R_1$—$SO_2$—S—$R_2$—SH, where $R_1$ is MOF of the present invention containing appropriate pendant groups, such as a pendant benzyl groups, to which the ligand (—$SO_2$—S—$R_2$—SH) is attached to the pendant benzyl group, where $R_2$ is propyl, and where the dashed lines represent the ionic interactions with the lead. (It should be appreciated that FIG. 25 is not intended to illustrate any steric or otherwise proportional/three dimensional aspects of the chemical compound and the binding of the lead.)

As shown, lead is complexed by the ligand through two linkages, one with the mercapto-sulfur of the thio-sulfonyl moiety (or the sulfhydril moiety adjacent to the sulfonyl (also termed a thio-sulfonyl bond) that is attached to the polymer) and the terminal mercapto group at the terminal end of the ligand. In other words, the alkyl, in this case the propyl alkyl, separates the two points to which the lead is electronegatively complexed along the ligand. Accordingly, once complexed to the ligand in this manner, the lead is basically captured in a geometric six-member open ring consisting of the ligand backbiting onto the cation. Such binding secures the lead to the ligand attached to the MOF and thereby removes the lead from the liquid or liquid stream.

In some embodiments, lead can be captured up to 200 mg/gm capacity for the thio propyl sulfonyl mercaptan ligand (i.e., the ligand of FIG. 23). Testing has shown that lead concentrations as high as 50 ppb in water (as lead nitrate) could be reduced to below 0.5 ppb within a matter of minutes exposure time. Therefore, in some embodiments, the concentration of lead in the effluent liquid stream may be below 1 ppb or at an ultra-low level. Further, the pH of the effluent liquid approached that of concentrated nitric acid when the test analyte was lead in nitrate form, which illustrates that the bis-sulfhydril complex or the interaction of the lead to the sulfur adjacent to the sulfonyl (i.e., the mercapto-sulfur of the thio-sulfonyl moiety) is highly stable, as the corresponding low pH of the effluent did not exhibit any deleterious effect on lead removal. Therefore, this reduces or eliminates the possibility of any desorption of the lead from the ligand back into the liquid or liquid stream.

It should be appreciated that the adsorption of an anion by a MOF of the present invention as described above and the complexation of a cation by the ligand attached to the MOF as described above can occur within the same MOF compound. It should be appreciated that the adsorption of an anion and the complexation of a cation can occur simultaneously or in sequence with either the anion or the cation being the first species to interact with the MOF.

It should also be appreciated that alternative embodiments are possible and that the invention is not limited to the specific embodiments described above. For example, in some embodiments, adsorption of aqueous selenate and selenite can be obtained by a series of highly porous, water stable, Zr-based MOFs. Both selenate and selenite are shown to bind to the node in a bridging ($\eta_2\mu_2$) fashion where one di-anion bridges two zirconium metal centers. Adsorption of oxy-anions of antimony, including oxy-anions in either the Sb[III] (antimonite) or the Sb[V] (antimonate) redox state; and oxy-anions of lead, including oxy-anions in either the Pb[II] or the Pb[IV] redox state, such as Pb$(OH)_6^{2-}$, Pb$(OH)_6^{4-}$, PbO$_3^{2-}$, and PbO$_2^{2-}$ can also be obtained by a series of highly porous, water stable, Zr-based MOFs. Further, adsorption of these species can be obtained even in the presence of competitive species.

Further, because there exists in the literature established chemistries for altering the metal components of a MOF, one of sufficient expertise in the art ought to be able to produce MOFs related to NU-1000 that contain less expensive metal constituents, like using zirconium metal precursors which are only 90% pure and contain hafnium. In fact, in the present invention, one embodiment was tested in which an NU-1000 MOF analogue containing Zr:Hf within the nodal components at a ratio of 9:1. It was found in similar experiments as those prescribed above for NU-1000 itself, that the 90% Zr/10% Hf MOF indeed exhibited similar excellent nodal uptake of selenium derived oxy-anions (i.e., 90% to as high as 95% of the uptake seen with the pure Zr NU-1000 MOF), implying that commercial cost reduction should be possible through the use of less pure zirconium starting materials to make NU-1000.

Further still, because it is known that generally one expert in the art should be able to derive regeneration procedures for anion removal media via acid treatment, such as but not limited to hydrochloric, sulfuric or nitric acid washes, so as to recover previously used removal media for re-use with the overall purpose of operation cost reduction. As such, one expert in the art should be able to subject MOFs to similar acid washing techniques to regenerate NU-1000 for continued re-use once saturated with oxy-anion impurity, such that overall cost of the water treatment operation employing the MOF is reduced to a point of economic feasibility.

It should also be appreciated that the MOFs of the present invention with the ligand attached for complexation of cations may be used in various environments or industries in which removal of cationic species is desirable, as the ability to reduce the concentration of large cations in a given liquid solution or stream may have several beneficial effects. For example, reducing the concentration of lead ($Pb^{2+}$) in a given liquid stream can reduce stress corrosion cracking in certain materials in which the liquid stream comes in contact. In addition, removal of certain cation species such as cationic lead and mercury may provide health and environmental benefits. Given that drinking water limits for lead may be as low as 10 ppb, the present invention provides the ability to remove lead in a given liquid stream to such an acceptable levels.

The present invention also describes methods for attaching a MOF to a substrate to form a MOF-containing product that can be used in numerous ways depending upon the specific MOF attached to the substrate. Accordingly, it should be appreciated that a particular MOF having a particular property, such as an affinity for a particular species to be removed from a given fluid, may be selected for attachment to the substrate. The substrate may be any substrate to which a given MOF may be attached, and the form and shape of the substrate may be selected based upon its ultimate use. For example, the configuration or shape of the substrate may be selected to allow use of the selected MOF in a given environment, such as a given industrial process or a given piece of equipment, and provide the proper exposure of the MOF in that environment, such as exposure of the MOF to a given fluid in a given process or piece of equipment. It should be appreciated that while reference herein is generally to MOF in the singular, such should also be interpreted as appropriate as referring to a plurality of MOF particles, as opposed to a single MOF particle or structure. For example, description regarding the mechanism for attachment of a MOF to a substrate may be interpreted as the mechanism for attachment of a single MOF particle; however, it should be understood that in attaching a MOF to a substrate that a plurality of MOF particles would obviously be attached to a given substrate.

Accordingly, the present invention provides methods for disposing a given MOF on a substrate to form a commercial product. The present invention also provides methods for utilizing that commercial product in a given process to remove certain chemical species or compounds from a fluid, such as a liquid or a liquid stream or a gas or gas stream. The following provides a description of these methods, including the MOFs and the substrates that may be used in the present invention, noting that such are exemplary and not intended to represent the only MOFs or substrates that may be used or the only manner in which the MOF-containing substrate product may be used.

As noted, the MOF may be any of the MOFs described herein. For example, the MOF may be one capable or configured to remove certain chemical species or compounds from a liquid or a liquid stream, such as an industrial process liquid stream. In some embodiments, the MOF is a Zr-based MOF or a Zn-based MOF. In some embodiments, the MOF is a Zr-based MOF, such as NU-1000 having a molecular formula of $Zr_6(\mu_3-O)_4(\mu_3OH)_4(OH)_4(H_2O)_4$ $(TBAPy)_2$, wherein TBAPy is 1,3,6,8-tetrakis (p-benzoic-acid)pyrene, with or without certain ligands attached. This MOF has been shown to remove oxy-anions of selenium, including selenite ($SeO_3^{2-}$) and selenate ($SeO_4^{2-}$); oxy-anions of antimony, including oxy-anions in either the Sb[III] (antimonite) or the Sb[V] (antimonate) redox state; and oxy-anions of lead, including oxy-anions in either the Pb[II] or the Pb[IV] redox state, such as $Pb(OH)_6^{2-}$, $Pb(OH)_6^{4-}$, $PbO_3^{2-}$, and $PbO_2^{2-}$. It should be appreciated that in some embodiments, the adsorption of the oxy-anion by the MOF is through nodal uptake via the zirconium oxide/hydroxide nodal features of the MOF. U.S. Patent Application Publication No. US 2016/0318773 A1, entitled "Metal-Organic Frameworks for Adsorption of Liquid Phase Compounds," and U.S. Patent Application Publication No. US 2018/0134581 A1, entitled "Metal-Organic Frameworks for Adsorption of Liquid Phase Compounds," describe this particular MOF, including its synthesis and use, and are each hereby incorporated by reference in their entireties herein.

Further, the addition of certain ligands to this MOF provides for the removal of certain cation species, such as divalent lead ($Pb^{2+}$) or mercury ($Hg^{2+}$) and similar cations, as well as the ability to concurrently remove both cationic and anionic species from a given liquid or liquid stream. In some embodiments, the ligand for complexation with cationic species attached to the MOF is a thiosulfonyl-thiol ($—SO_2—S—R_2—SH$, where $R_2$ is an alkyl group, which may be ethyl or propyl) ligand, also known as a thio-alkyl-sulfonyl-mercaptan ligand.

This ligand may be attached to the MOF through a pendant group attached to the MOF, such as a pendant benzyl group to which the sulfonyl (i.e., $—SO_2—$) functionality of the ligand attaches. In some embodiments, the pendant group is attached to a linker of the MOF. It should be appreciated that multiple pendant groups, each attached to separate linkers of the MOF, can be used. It should be also appreciated that the sulfonyl group attached to the MOF is such that the thioalkyl group can be attached to the sulfonyl group on the MOF through nucleophilic attack. Therefore, any pendant group to which the sulfonyl group can be attached, and that itself can be attacked nucleophilically, can be used to attach the ligand of the present invention to the MOF. In some embodiments the pendant group is a pendant benzyl group.

It should be appreciated that appropriate pendant groups can be attached to the linker portions of the MOF using solvent assisted linker exchange (SALE) or solvent assisted ligand incorporation (SALI) (see for example, P. Deria, W. Bury, J. T. Hupp and O. K. Farha, "Versatile Functionalization of the NU-1000 Platform by Solvent-Assisted Ligand Incorporation," *Chem. Commun.* 2014, 50, 1965-1068; and, P. Deria, J. E. Mondloch, O. Karagiardi, W. Bury, J. T. Hupp and O. K. Farha, "Beyond Post-Synthesis Modification: Evolution of Metal-Organic Frameworks via Building Block Replacement," *Chem. Soc. Rev.,* 2014, 43, 5896-5912). Accordingly, SALE or SALI can be used to attach pendant benzyl groups to various positions on the MOF, including the organic linker portions. In one embodiment, pendant benzyl groups can be created by attaching a phenyl group to the linker portion of the MOF via a styrene bond (e.g., [MOF]-HC=C—CH-phenyl). In some embodiments, SALE may be used to place the pendant benzyl group within or inside of the MOF structure, such as in the middle or approximately in the middle, of the MOF, as opposed to, in some embodiments, using SALI to place the pendant benzyl group near the aperture of the MOF structure.

With respect to the complexation of the cationic species with the ligand attached to the MOF for complexation with cationic species, it should be appreciated that an important aspect of the ligand is the synthesis of the $—SO_2—S—$ bond, i.e., the S—S bonding between the thio-alkyl and the sulfonyl moieties. This provides a ligand having a mercapto-sulfur of the thio-sulfonyl moiety and a terminal mercaptan moiety (—SH). As described below, a cation such as lead is complexed through a bis-sulfur interaction with the ligand in which the lead cation ($Pb^{2+}$) complexes with the mercapto-sulfur of the thio-sulfonyl moiety and to the terminal mercaptan moiety (—SH), which essentially "backbites" the lead cation ($Pb^{2+}$) thereby forming five or six member open rings or ring-like geometries, depending upon whether the $R_2$ alkyl group is ethyl or propyl, respectively. The complexation of the cation with the ligand may also be referred to as an ionic interaction or chemisorption, which occurs through the positive charge on the cation and the electronegativity of the mercapto-sulfur of the thio-sulfonyl moiety and a terminal mercaptan moiety. Accordingly, it should be appreciated that cations other than lead may be complexed using the ligand of the present invention. For example, cations that are similar to lead ($Pb^{2+}$), such as cationic mercury, may be complexed in a similar fashion.

It should be appreciated, however, that other MOFs may be used and attached to a given substrate. For example, the MOF may be a Zr-based MOF used to remove certain chemical species, such as water, from a gas stream or air, including ambient air. Such MOFs may include MOF-801, 801-P, 802, 805, 806, 808, 812, and 841. In some embodiments, such MOFs once attached to a given substrate may be used to remove water from ambient air at night and use solar energy during the day to effectively produce liquid water without electrical power consumption. These MOFs are described in Hiroyasu Furukawa, Felipe Gandara, Yue-Biao Zhang, Juncong Jiang, Wendy L. Queen, Matthew R. Hudson, and Omar M. Yaghi, "Water Adsorption in Porous Metal-Organic Frameworks and Related Materials," J. Am. Chem. Soc. 136, 4369-4381 (2014), the entirety of which is incorporated by reference herein.

Also as noted, the substrate may be any substrate to which a given MOF may be attached and that is suitable for use in the environment or process in which it will be used to remove certain chemical species or compounds from a liquid or a liquid stream. In some embodiments, the substrate may be an inert substrate to avoid any chemical interaction with the liquid or liquid stream being treated. In some embodiments, the substrate has a physical shape that allows for its deployment and use in a given process or in a particular piece of processing equipment for removing certain chemical species from a given liquid stream. In some embodiments, the substrate may be a bead or plurality of beads. In some embodiments, the beads may be inert polypropylene polymer resin beads. In some embodiment, the substrate may be a macroscopic fabric, such as a mesh material or mesh filter. In some embodiment, the substrate may be a molecular fabric made from organic strands, essentially consisting of a two dimensional copolymer framework or organic woven material.

It should be understood that the following description of the methods for attaching a given MOF to a substrate, as well as the description of the methods for using the substrate with the attached MOF, refers to a MOF generically. However, it should be appreciated that in all of the embodiments described herein, the specific MOFs noted above may be used. Accordingly, it should be appreciated that while some of the above specific MOFs are capable of removing, or configured to remove, specific liquid phase cationic and anionic species, other MOFs capable of removing other liquid phase species from a liquid or liquid stream may similarly be used and attached to a given substrate. Further, while some of the above specific MOFs are capable of removing certain species from a gas or gas stream, such as water from ambient air, other MOFs capable of removing other gas phase species from a gas or gas stream may similarly be used and attached to a given substrate. (It should be appreciated that the term "gas" or "gas stream" is used generically and includes any gas or gas stream containing condensable species or entrained vapor or particles.) In addition, while the following methods are described with reference to specific substrates, it should be appreciated that other substrates, including substrates having a difference chemical composition or having a different geometric shape, may be used in any combination with any suitable MOF.

In general, methods for attaching a given MOF particle to a substrate may depend upon the specific substrate used. Accordingly, the following describes methods for attaching a given MOF to a bead, including a plurality of beads, a macroscopic fabric, such as a mesh fabric or mesh filter, and a molecular fabric made from organic strands, essentially consisting of a two dimensional copolymer framework or organic woven material.

In some embodiments, a given MOF may be attached to a substrate that is a bead or a plurality of beads. In some embodiments, the bead may be an inert polypropylene polymer resin bead. In general, the method for attaching the MOF is performed using a buffer modifier that adheres the MOF to the surface of the bead. In some embodiments, the buffer modifier may be a buffer modifier typically used in capillary electrophoresis such as an osmotic flow modifier, including cetyl-trimtheylammonium bromide (CTAB) and beta-cyclodextrin (beta-CD). Both CTAB and beta-CD are compounds that bind well to MOF particles at room temperature and cause the MOF to be chemisorbed onto the surface of the bead.

In one embodiment, CTAB may be used to attach the MOF to the bead surface. In this case, atomic layer deposition (ALD) is used to seed the beads with metal oxides that provide surface hydroxyl groups capable of forming chemical bonds with MOF particles via the CTAB. In some embodiments, the metal oxide chemisorbs onto the bead surface in water, thereby making hydroxyl groups available for attachment to the CTAB, via, for example, the cationic head groups of the CTAB. These metal oxides include, but are not limited to, aluminum oxide, titanium oxide, zinc oxide, and combinations thereof. Once exposed to water, the deposited metal oxides will appear similar to silicon dioxide/surface hydroxide in a capillary electrophoresis osmotic flow reversal application of CTAB. Accordingly, the MOF is then attached to the CTAB through hydrogen bonding, electrostatic interactions, and van der Waals forces. Without being limited by theory, it is believed that the non-polar surfaces of the MOF, such as the organic linkers of the MOF, attach to the trimethyl "arms" of the CTAB.

In one embodiment using CTAB, the beads may first be subjected to ALD to chemisorb the metal oxide to the surface of the beads. Separately, the CTAB and MOF may be combined at room temperature to attach the MOF to the CTAB and form a solution of the CTAB with the MOF attached. The beads with the metal oxide attached may then be contacted with the solution or combined with the CTAB having the attached MOF resulting in the CTAB attaching to the bead surface via the metal oxide, again, which can be done at room temperature in a water solution and in some embodiments in a basic water solution. Alternatively, the beads after being subjected to ALD to attach the metal oxide may be mixed in a water solution containing the MOF and, in some embodiments, a basic water solution containing the MOF. Subsequently, the CTAB may be added to the solution to attach to both the MOF and the metal oxide resulting in attachment of the MOF to the bead surface. Thereafter, the beads can be washed and dried. Accordingly, at this point, a MOF-adsorbed bead, such as a plurality of MOF-adsorbed polypropylene beads, has been produced and may constitute a commercial product that can be used as further described below.

In another embodiment, beta-CD may be used to attach the MOF to the bead surface. In this case, the substrate does not need to be subjected to ALD. Rather, the non-polar region of the beta-CD will attach to a corresponding non-polar portion of the polypropylene beads via hydrogen bonding, electrostatic interactions, and van der Waals forces. The MOF can then be attached to the beta-CD via interaction between one or more polar portions on the surface of the MOF with the negative charge on the beta-CD. In some embodiments, the MOF can be attached to the beads in a water solution containing beta-CD. In some embodiments, a less polar solvent, such as an alcohol, may be used. Thereafter, the beads can be washed and dried. Accordingly, at this point, a MOF-adsorbed bead, such as a plurality of MOF-adsorbed polypropylene beads, has been produced and may constitute a commercial product that can be used as further described below.

It should be appreciated that in some embodiments both beta-CD and CTAB may be used in combination. In this case, the substrate or beads would be subjected to ALD, after which a solution containing the MOF and both CTAB and beta-CD would be added.

It should also be appreciated that in some embodiments, the surface of the beads for functionalization of the CTAB and beta-CD may be silicon dioxide. In some cases, silane hydroxide chemistry may be used to functionalize the polymer bead to accept silicon adducts followed by hydroxide to provide the necessary chemistry for the attachment of the CTAB or beta-CD.

In another embodiment, the invention comprises a method for attaching the MOF to a macroscopic fabric for subsequent use. In some embodiments, the macroscopic fabric may be any fabric, including artificial fiber-based materials, to which a given MOF may be attached. In some embodiments, the macroscopic fabric is a mesh material or a mesh filter, including an inert polypropylene-based mesh material or filter. Accordingly, it should be appreciated that the fabric may have any dimensions, such as any area or surface area, as desired or dictated by the ultimate use of the fabric. MOF particles may be attached to the fibers of the fabric in the same manner described above for attachment to a bead. Accordingly, it should be appreciated that buffer modifiers such as beta-CD and CTAB may be used as described above to attach the MOF to the fabric in combination with ALD treatment of the fabric. After attachment of the MOF to the macroscopic fabric, a MOF-adsorbed macroscopic fabric has been produced and may constitute a commercial product that can be used as further described below. It should be appreciated that the term "macroscopic" is being used to distinguish this fabric as being one that is visible to the naked eye or that can be physically manipulated by hand, as opposed to a molecular fabric as described below.

In another embodiment, the invention comprises a method for attaching the MOF to a molecular fabric for subsequent use. In some embodiments, the molecular fabric is made from organic strands, essentially forming a two dimensional copolymer framework or organic woven material, to which a given MOF may be attached. MOF particles may be attached to the strands of the fabric in the same manner described above for attachment to a bead. Accordingly, it should be appreciated that buffer modifiers such as beta-CD and CTAB may be used as described above to attach the MOF to the fabric in combination with ALD treatment of the fabric. After attachment of the MOF to the molecular fabric, a MOF-adsorbed molecular fabric has been produced and may constitute a commercial product that can be used as further described below. It should be appreciated that the molecular fabric is a fabric formed at the molecular level and is, therefore, much smaller in size than, for example, the macroscopic fabric described above.

Once attached, the substrate with the attached MOF can be used to remove certain chemical species from a liquid or liquid stream, such as industrial liquid streams (e.g., power plant coolant streams such as nuclear power plant streams) or waste streams. Generally, the substrate with the attached MOF would be positioned to allow contact between the liquid containing one or more liquid species to be removed from the liquid with the MOF. Upon contact, the liquid species to be removed would attach to the MOF and, therefore, be removed from the liquid. In this regard, the manner in which the substrate with the attached MOF would be used depends the particular MOF attached and the liquid phase species that it can remove and upon the physical configuration of the inert substrate used (e.g., beads or fabric).

In the case of beads, such could be used in the same manner as traditional resin beads to remove certain chemical species from a liquid, for example, by placing the beads in a resin bed in a given vessel through which the liquid being treated would pass. It should be appreciated that existing equipment designed to manage resin beads may be adapted if necessary to manage the use of beads coated with MOF particles. In one embodiment, a cylindrical vessel containing a bed of beads coated with MOF particles could be used. In this case, the bed of beads would be stationary within the vessel and a liquid stream would pass through the vessel, thereby passing through the bed of beads and providing contact between the liquid containing a liquid species to be removed and the MOF particles. Upon contact, the liquid species to be removed would attach to the MOF and, thereby, be removed from the liquid passing through the vessel.

It should be appreciated that in some embodiments in which the vessel contains resin beads that are used to remove certain liquid phase species, such resin beads can be replaced with beads coated with a given MOF according to the present invention. In one embodiment, when the resin beads are in need of replacement, such can be easily replaced with beads coated with a given MOF according to the present invention within the same equipment. Alternatively, the resin beads could be replaced with inert polypropylene beads and attachment of the selected MOF can be performed in-situ. In this case, the beads could be pre-treated with ALD to attach a given metal oxide and then disposed within the vessel or such treatment with ALD to attach a metal oxide could also be performed in-situ. In the latter case, the beads would be disposed within the vessel and then treated using ALD to attach a metal oxide. Thereafter, a solution containing CTAB and the selected MOF could be added to the vessel to attach the CTAB and the MOF to the beads, or a solution of CTAB could be added to the vessel followed by a solution of the selected MOF. The result would be the replacement of the original resin beads with beads coated with a selected MOF without having to alter or change any of the existing equipment used for the original resin beads.

Alternatively, the beads would be disposed within the vessel and thereafter, a solution containing beat-CD and the selected MOF could be added to the vessel to attach the beta-CD and the MOF to the beads, or a solution of beta-CD could be added to the vessel followed by a solution of the selected MOF. The result would be the replacement of the original resin beads with beads coated with a selected MOF without having to alter or change any of the existing equipment used for the original resin beads.

In the case of a macroscopic fabric coated with a select MOF, such fabric could be positioned or placed such that a liquid stream would pass through the fabric, thereby providing contact between the liquid containing a liquid species to be removed and the MOF particles attached to the fibers of the fabric. Upon contact, the liquid species to be removed would attach to the MOF and, thereby, be removed from the liquid passing through the fabric. It should be appreciated that the fabric may be placed within a vessel or pipe or any piece of equipment such that the liquid would pass through the fabric.

In one embodiment, a demineralizer through which a liquid stream passes may be used. In this case, the macroscopic fabric may be a mesh filter that can be wound into a spiral, thereby creating a lumen in the center. Liquid may pass into the demineralizer and around the outside of the wound mesh filter. The liquid would then pass through the wound mesh filter and into the lumen or center of the demineralizer and out through the center of the demineralizer. It should be appreciated that in some embodiments, an existing mesh filter may be coated with a select MOF. In this case, the MOF can be attached to the existing mesh filter in-situ in the same manner as described above for in-situ coating of beads in an existing vessel.

It should also be appreciated that a MOF-coated fabric may be used in many different situations. In one embodiment, the MOF-coated fabric may be used on top of a resin bed to facilitate removal of liquid phase species, either providing removal of other liquid phase species relative to those removed by the resin bed or additional removal of the same or similar species. Additionally, it should be appreciated that in the embodiment in which a bed of beads are coated with a select MOF in-situ, the use of a macroscopic fabric on top of the bed may also be coated with a select MOF in-situ and concurrently with the coating of the bed of beads. Accordingly, it should also be appreciated that the MOF used for the beads and the fabric may be the same or different, noting that if different, either the beads or the fabric may need to be coated prior to disposing both within a given vessel.

In the case of a molecular fabric coated with a select MOF, such fabric could be positioned or placed such that a liquid stream would pass through the fabric, thereby providing contact between the liquid containing a liquid species to be removed and the MOF particles attached to the fibers of the fabric. Upon contact, the liquid species to be removed would attach to the MOF and, thereby, be removed from the liquid passing through the fabric. It should be appreciated that the fabric may be placed within a vessel or pipe or any piece of equipment such that the liquid would pass through the fabric. It should also be appreciated that the molecular fabric could be generated in-situ and the select MOF particles attached thereafter. In some embodiments, the molecular fabric could be constructed such that it is located on at the outlet of a vessel, such as a vessel containing resin beads in a bed or a demineralizer.

Regardless of the substrate used, however, it should be appreciated that for a given liquid stream and concentration of various liquid phase components to be removed, the capacity of a selected MOF to remove those liquid phase components will generally be much greater, such that saturation of the MOF is not a limitation. Accordingly, rather than using, for example, a bed full of MOF particles, the use of a substrate coated with MOF particles will still provide the requisite surface area required to obtain the desired removal of a given liquid phase species.

Various embodiments of the invention have been described above. However, it should be appreciated that alternative embodiments are possible and that the invention is not limited to the specific embodiments described above.

What is claimed is:

1. A chemical compound for complexing with both a liquid phase oxy-anion and a liquid phase cation, comprising:
   a chemical compound having the formula $R_1$—$SO_2$—S—$R_2$—SH, wherein $R_1$ comprises a zirconium-based metal-organic framework and $R_2$ comprises an alkyl;
   wherein said chemical compound is attached to a substrate.

2. The chemical compound of claim 1, wherein said metal-organic framework comprises NU-1000.

3. The chemical compound of claim 1, wherein $R_2$ comprises ethyl or propyl.

4. The chemical compound of claim 1, wherein $R_2$ comprises ethyl.

5. The chemical compound of claim 1, wherein $R_2$ comprises propyl.

6. The chemical compound of claim 1, wherein said substrate comprises an inert polypropylene bead.

7. The chemical compound of claim 6, wherein said wherein said metal-organic framework comprises NU-1000 and $R_2$ comprises ethyl or propyl.

* * * * *